(12) United States Patent
Srinivasaraghavan

(10) Patent No.: US 10,579,631 B2
(45) Date of Patent: Mar. 3, 2020

(54) PRIMING-BASED SEARCH AND DISCOVERY OF CONTENT

(71) Applicant: Verizon Patent and Licensing Inc., Arlington, VA (US)

(72) Inventor: Haripriya Srinivasaraghavan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 218 days.

(21) Appl. No.: 15/798,565

(22) Filed: Oct. 31, 2017

(65) Prior Publication Data
US 2019/0129960 A1  May 2, 2019

(51) Int. Cl.
| | | |
|---|---|---|
| G06F 17/30 | (2006.01) | |
| G06F 16/2457 | (2019.01) | |
| G06F 3/048 | (2013.01) | |
| G06F 16/40 | (2019.01) | |
| G06F 16/248 | (2019.01) | |
| G06F 16/435 | (2019.01) | |

(52) U.S. Cl.
CPC ........ *G06F 16/24578* (2019.01); *G06F 3/048* (2013.01); *G06F 16/248* (2019.01); *G06F 16/40* (2019.01); *G06F 16/435* (2019.01)

(58) Field of Classification Search
CPC ... G06F 16/24578; G06F 16/40; G06F 16/248
USPC .................................................. 707/600–899
See application file for complete search history.

(56) References Cited

U.S. PATENT DOCUMENTS

2013/0218899 A1\* 8/2013 Raghavan ........... G06F 16/3328
                                                            707/741

\* cited by examiner

*Primary Examiner* — Isaac M Woo

(57) ABSTRACT

A method, a device, and a non-transitory storage medium are described in which a priming-based search and discovery service for contents uses a weighted graph that stores metadata pertaining to the contents, activation values, threshold values, and a distance parameter that limits the search space relative to primed nodes of the weighted graph that are relevant to search terms.

20 Claims, 20 Drawing Sheets

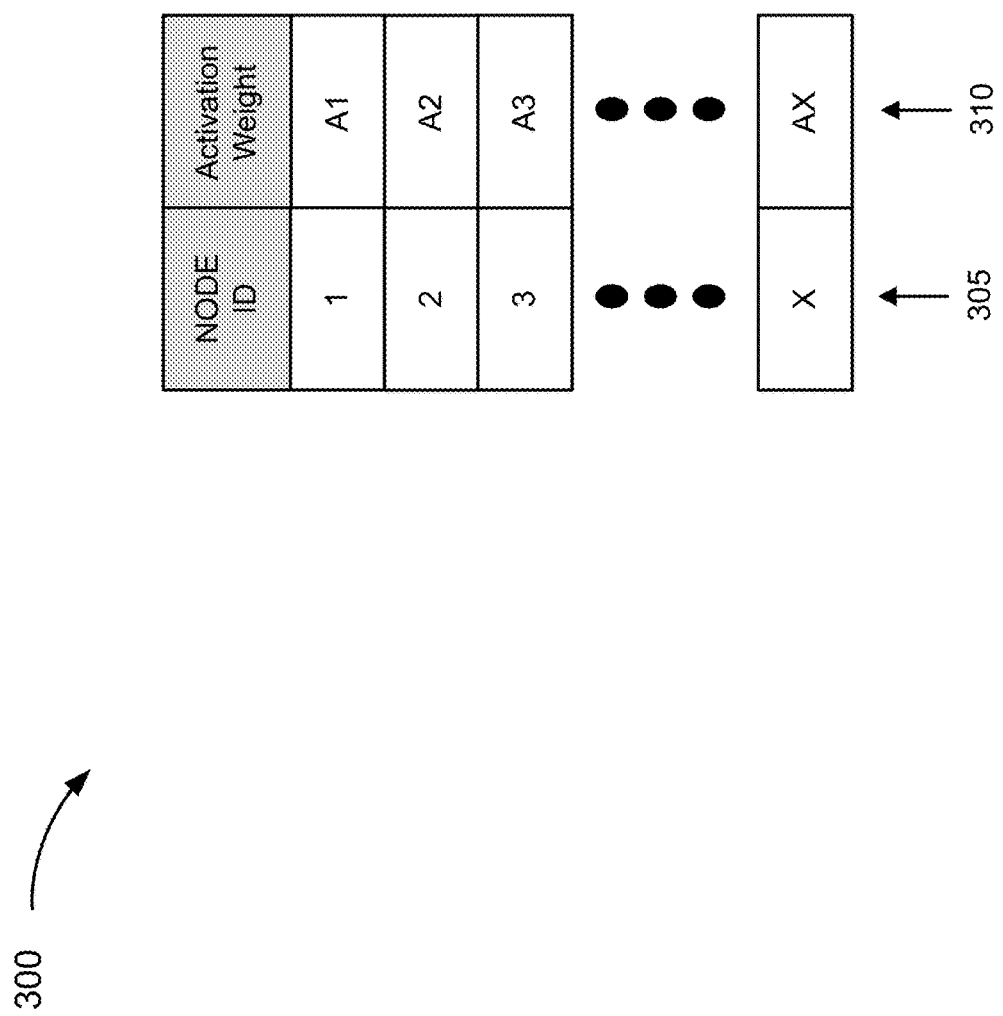

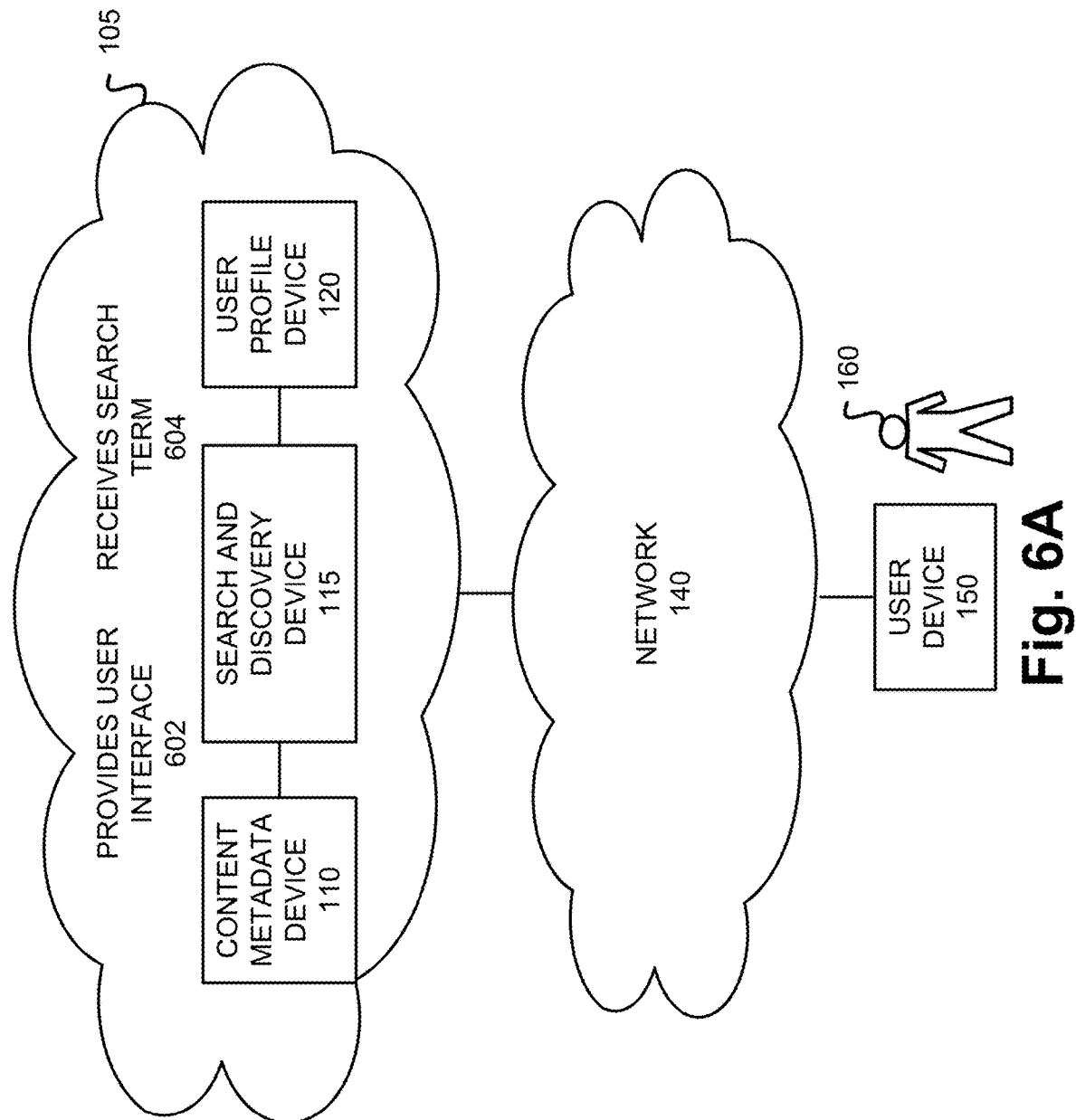

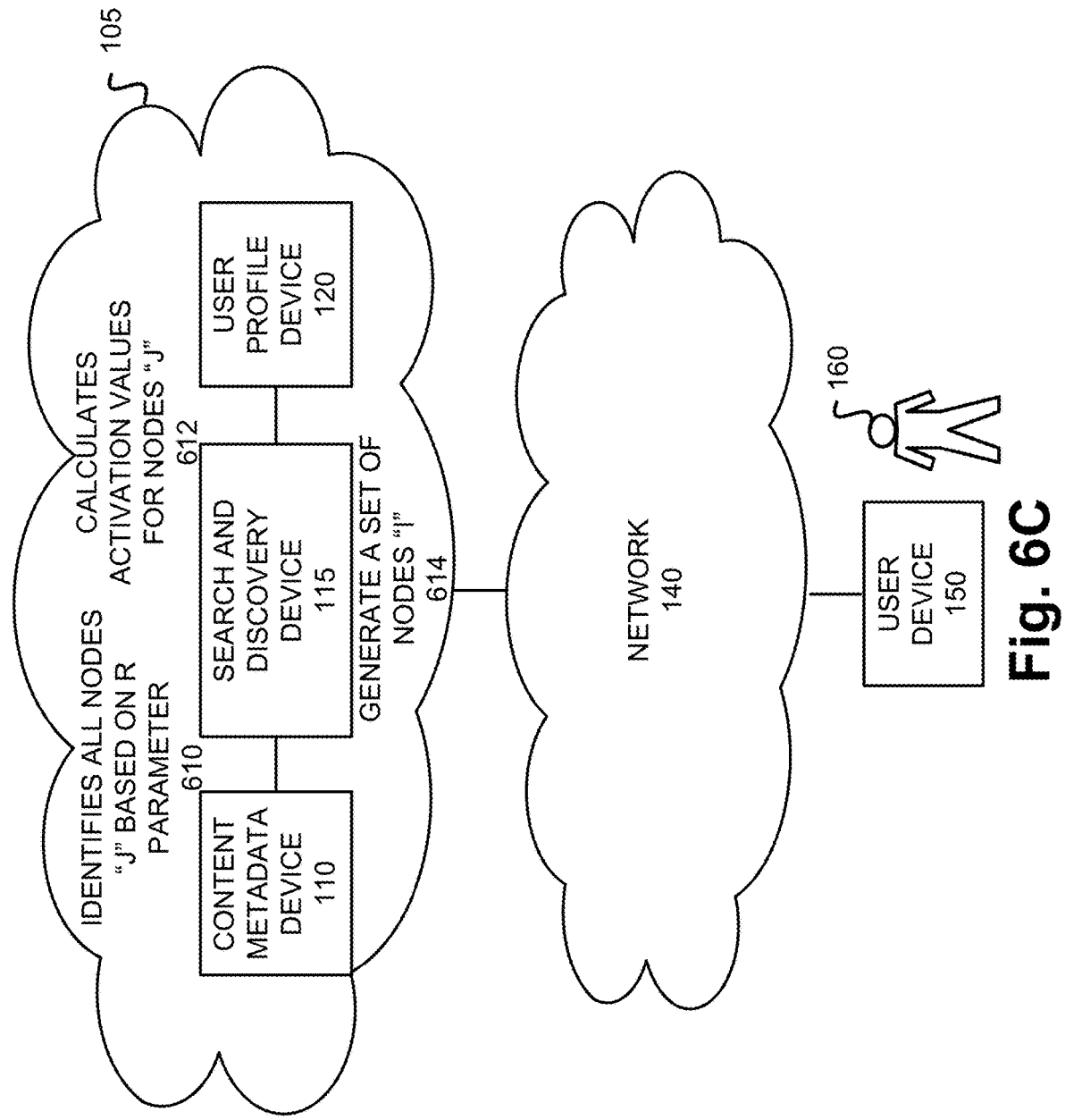

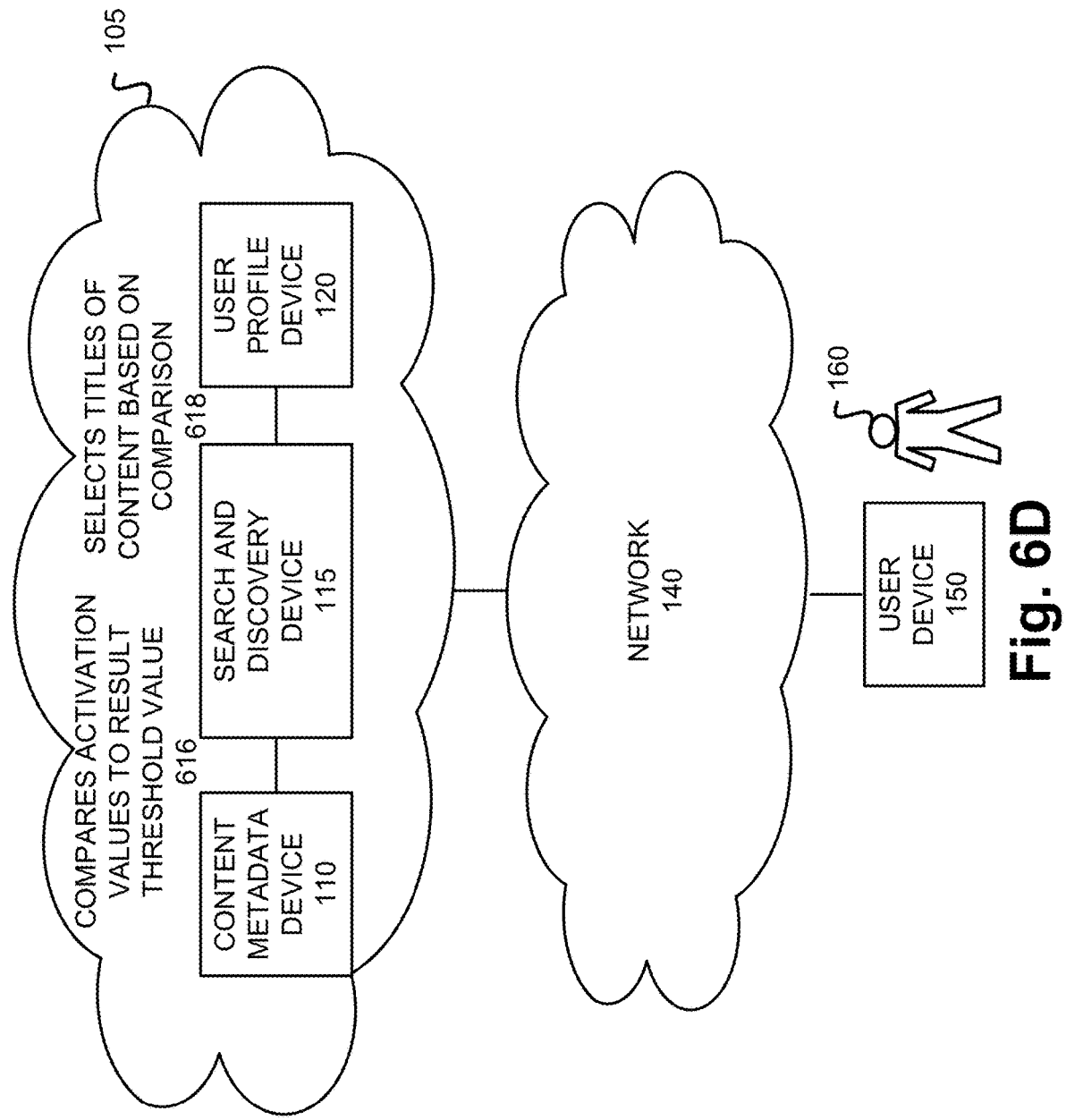

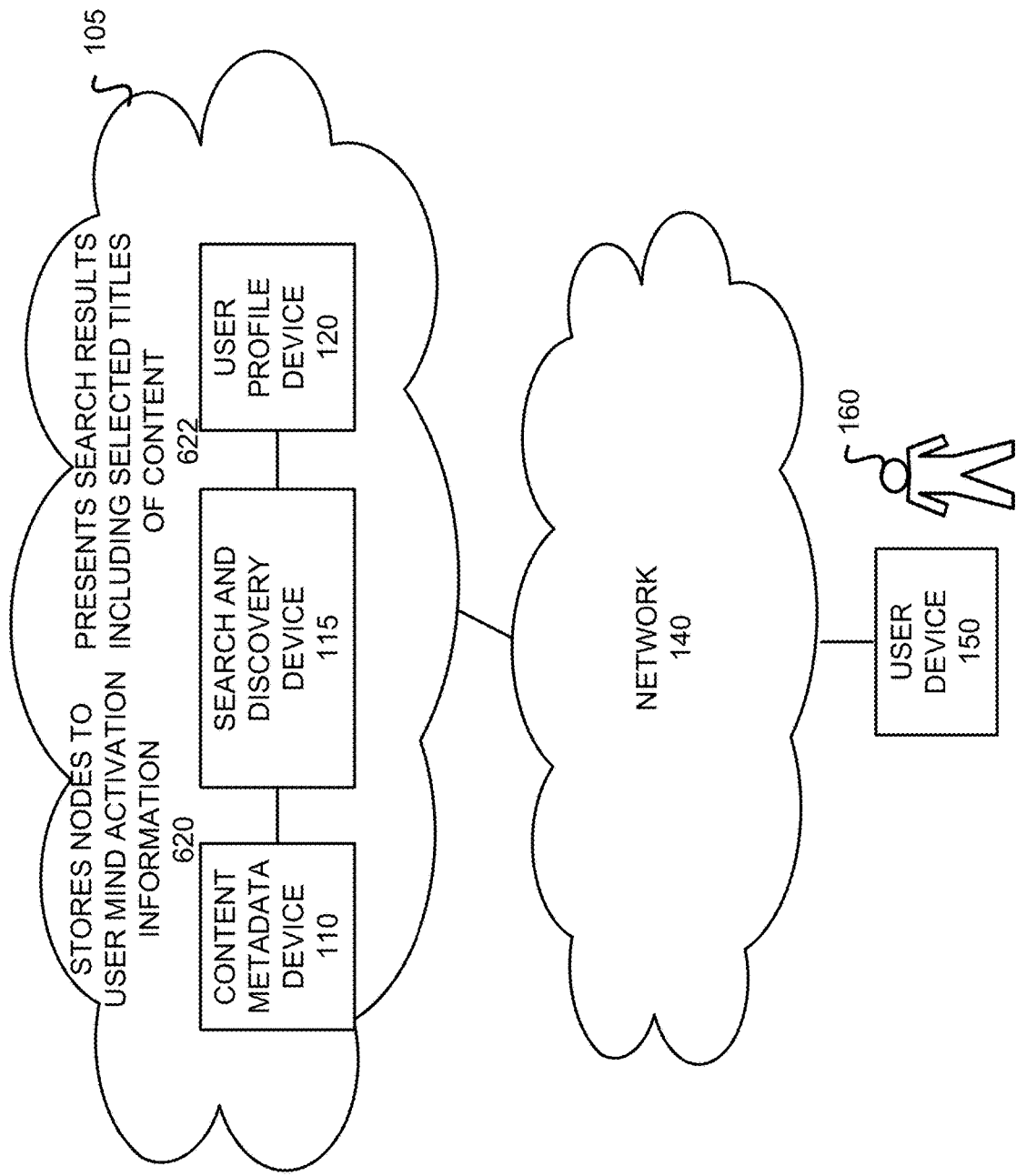

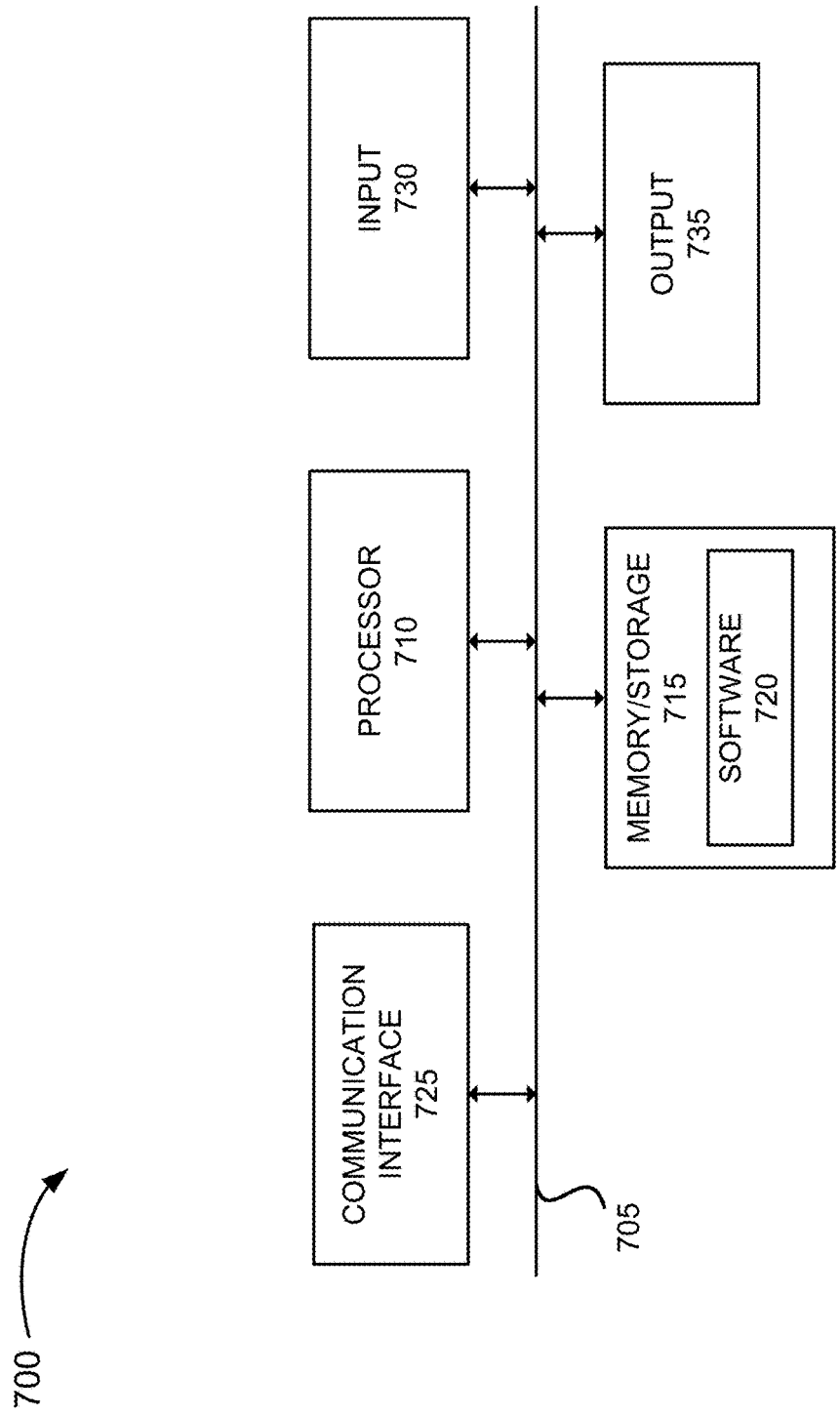

PRIMING-BASED SEARCH AND DISCOVERY OF CONTENT

BACKGROUND

A content network may include various network devices that store programs, allow users to search for programs, and recommend programs to users. For example, the content network may include search and discovery systems that search and identify contents that may be of interest to the users based on their search criteria.

BRIEF DESCRIPTION OF THE DRAWINGS

FIG. 3A is a diagram illustrating an exemplary data structure that may be used to store an exemplary embodiment of user mind activation information;

FIGS. 6A-6E are diagrams illustrating an exemplary process of the priming-based search and discovery service according to an exemplary scenario;

FIG. 7 is a diagram illustrating exemplary components of a device that may correspond to one or more of the devices illustrated and described herein;

DETAILED DESCRIPTION OF PREFERRED EMBODIMENTS

Figure 1:
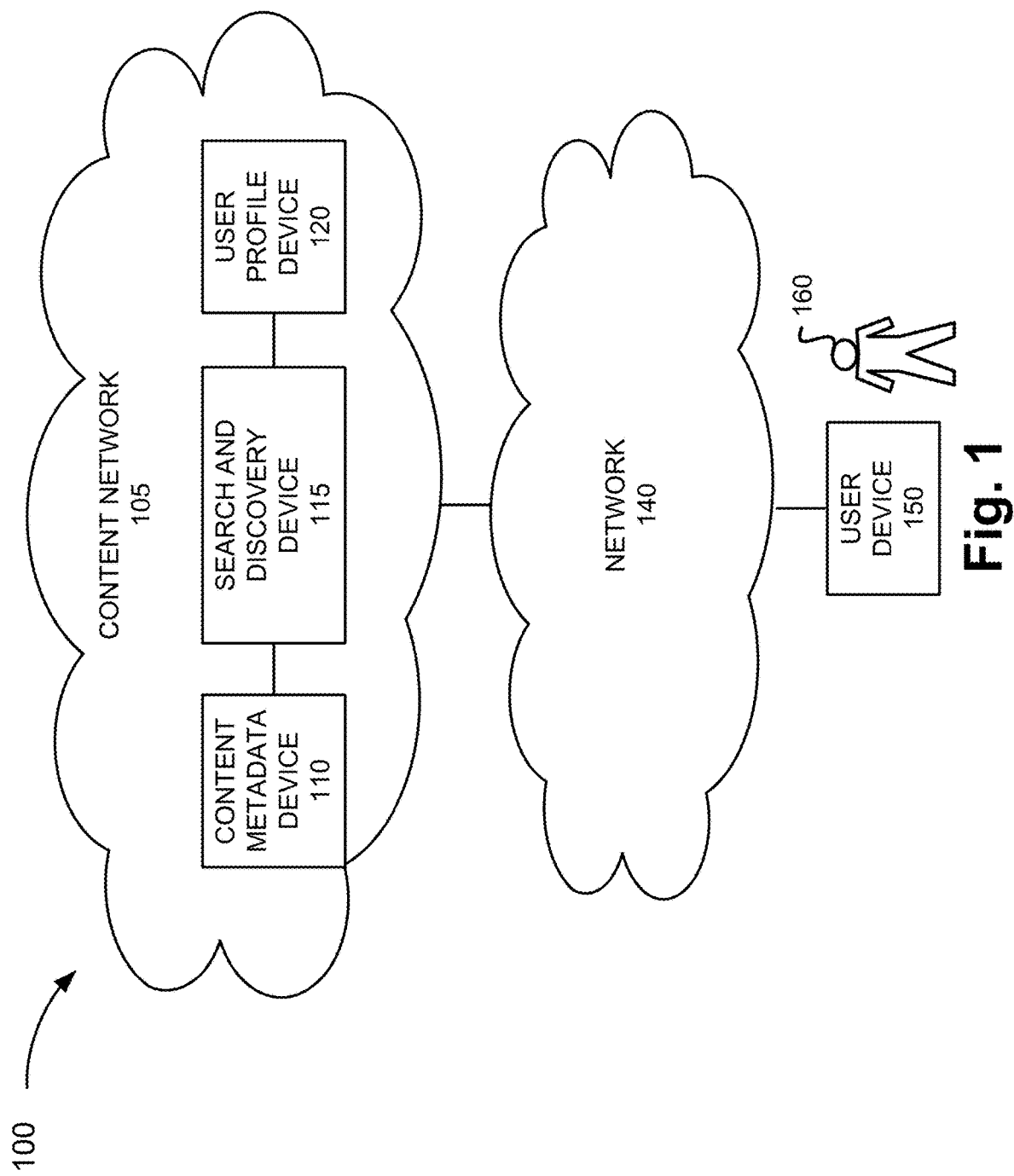
FIG. 1 is a diagram illustrating an exemplary environment in which exemplary embodiments of a priming-based search and discovery service may be implemented.

The following detailed description refers to the accompanying drawings. The same reference numbers in different drawings may identify the same or similar elements. Also, the following detailed description does not limit the invention.

Given the expansive nature of available contents for users to consume, service providers are confronted with various technological problems. For example, the search space within which users may search and discover contents of interest may be many times more massive than the contents itself when metadata of the contents is used as criteria to search and discover contents. As a consequence, the amount of time to search through the metadata, identify contents, limit the number of contents that may be of interest to the user, and present a search result within a time period that is tolerable to the user can be problematic.

In the study of human memory and behavior, various theories regarding multiple memory systems have been identified. One form of memory effect is priming, which is a type of non-conscious or implicit memory effect in that it can occur independently of any conscious or explicit recollection of a previous encounter with a stimulus. For example, exposure to one stimulus influences the response to another stimulus, such as the word "nurse" is more likely to be guessed by a person for a word completion puzzle "_u__e" when the person has been previously primed with the words "doctor" and "hospital." As a corollary, if a user has been using search terms, such as "doctor" or "hospital," the user may be more likely to subsequently use the search term "nurse" rather than "purse."

According to exemplary embodiments, a priming-based search and discovery service is described. According to exemplary embodiments, the priming-based search and discovery service is provided by a search and discovery system that includes logic to search and discovery contents based on priming. According to an exemplary embodiment, the search and discovery system provides the priming-based search and discovery service based on activation threshold-based priming. According to such an embodiment, the search and discovery system uses content metadata, user mind activation information, and a spreading activation function. The user mind activation information may indicate which instances of the content metadata are primed and to what degree at a given time in relation to a user based on the search terms used by the user. The spreading activation function may calculate the degree of priming and whether the instance of content metadata is presented in a search result. Given the interactive nature between the user and the search and discovery system that occurs, and the time element, the degree of priming for a given instance of content metadata may change over time. For example, the spreading activation function may include logic that calculates activation values and deactivation values (e.g., decay values) relative to instances of the content metadata. According to an exemplary embodiment, the search and discovery system limits the search space based on one or multiple parameter values, as described herein.

According to another exemplary embodiment, the search and discovery system provides the priming-based search and discovery service based on a context or entity-based priming. According to such an exemplary, the search and discovery system uses content metadata, user center of priming information, and a center of priming function. The user center of priming information may indicate an instance of the content metadata that is the center of priming. The center of priming function may calculate the center of priming. The center of priming may change over time based on the search terms received from the user. According to an exemplary embodiment, the search and discovery system limits the search space based on one or multiple parameter values, as described herein.

In view of the foregoing, the priming-based search and discovery service may improve the search and discovery of content by limiting the search space using the functions that select primed instances of content metadata, as described herein. For example, the search and discovery system searches, identifies, and selects only contents that represent what is in the user's mind at the moment. Additionally, the priming-based search and discovery service may reduce search and discovery time, reduce utilization of processing resources (e.g., processor, memory, etc.), and present candidate contents to a user for review and selection more quickly than other search and discovery systems.

FIG. 1 is a diagram illustrating an exemplary environment 100 in which an exemplary embodiment of the priming-based search and discovery service may be implemented. As illustrated, environment 100 includes a content network 105 and a network 140. Content network 105 includes a content metadata device 110, a search and discovery device 115, and a user profile device 120. According to other embodiments, environment 100 may include additional networks, fewer networks, and/or different types of networks than those illustrated and described herein. Environment 100 also includes an end device 150, which may be operated by a user 160.

The number and arrangement of network devices in content network 105, and the number of end devices 150 are exemplary. According to other embodiments, environment 100 may include additional devices, fewer devices, and/or differently arranged devices, than those illustrated in FIG. 1. For example, a single device in FIG. 1 may be implemented as multiple devices and/or multiple devices may be implemented as a single device. A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, a cloud device, a virtualized function, etc). The number and the type of network devices illustrated in environment 100 are exemplary.

Environment 100 includes communication links between the networks and between the network devices. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1. The number and the arrangement of communication links illustrated in environment 100 are exemplary.

Content network 105 includes a network that provides access to and use of a content service. Generally, content network 105 may be implemented as a satellite-based network, a terrestrial-based network, or a combination thereof. Content network 105 may be implemented to distribute contents using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, content network 105 may include various types of network devices that contribute to the access and use of the content service by users.

According to an exemplary embodiment, content network 105 includes network devices that provide the priming-based search and discovery service, as described herein. According to an exemplary embodiment, the priming-based search and discovery service is provided based on content metadata device 110, search and discovery device 115, and user profile device 115.

Content metadata device 110 includes a network device that stores and manages metadata of contents. According to an exemplary embodiment, the contents may be audio and visual contents, such as, for example, movies, television shows, and the like. According to other exemplary embodiments, contents may include audio content, such as, for example, music, and/or other forms of content (e.g., text, multimedia, etc.). Content metadata device 110 may be implemented to include a mass storage device. Content metadata device 110 may include logic that provides various storage-related functions, such as, add, delete, update, etc., the metadata. Content metadata device 110 may include logic that performs a query process. For example, content metadata device 110 may receive a query request from search and discover device 115, generate a query response, and transmit the response to search and discovery device 115. According to other exemplary embodiments, content metadata device 110 may not include logic that performs the query process.

The metadata may include, for example, data indicating a title of a content, a genre and/or a sub-genre of the content, cast and crew information, storyline information (e.g., plot summary, synopsis, tagline, etc.), a movie rating or a television rating (e.g., R, PG-13, TV 14, etc.), a date of release, a language, a runtime, a video format (e.g., 4K, HD, 3D, etc.), an audio format (e.g., stereo, Dolby Surround 7.1, etc.), filming location information, company credit information (e.g., production company, distributor, etc.), rating (e.g., user, critic, etc.), review (e.g., user, critic, etc.) and/or other information that pertain to the content (e.g., an image, a video trailer, web site address, etc.). According to an exemplary embodiment, content metadata device 110 may store the metadata in a graph. According to other exemplary embodiments, content metadata device 110 may store the metadata in other types of data structures or mass storage information entities (e.g., a database, etc.). A further description of the metadata is described below.

Search and discovery device 115 includes a network device that manages the priming-based search and discovery service. Search and discovery device 115 includes logic that performs search and discovery of contents based on the information stored in content metadata device 110, user profile device 120, and user input (e.g., search terms for content). According to an exemplary embodiment, search and discovery device 115 provides a user interface that obtains user inputs (e.g., search terms) and provides search results to users that indicate one or multiple contents. According to various exemplary embodiments, search and discovery device 115 includes logic that provides activation threshold-based priming, a context or entity-based priming, or both, of the priming-based search and discovery service.

According to an exemplary embodiment of the activation threshold-based priming, search and discovery device 115 includes logic that provides a spreading activation function. According to an exemplary implementation, the spreading activation function may be implemented based on the following exemplary expressions:

$$A[j]=(A[j]+A[i]*W[i,j])*D \text{ if } j \in \text{Set node } i \quad (1)$$

$$A[j]=A[j]*D \text{ if } j \notin \text{Set node } i \quad (2)$$

According to such an exemplary implementation, the parameter A[i] indicates an activation value associated with node "i", and the parameter A[j] indicates an activation value associated with node "j". The parameter W[i,j] indicates a weighted value associated with an edge between node "i" and node "j", and is further described in relation to FIG. 2 and elsewhere. The parameter "D" indicates a decay factor and may be assigned a value within a real number range (e.g., [0.0 . . . 1.0]). The parameters A[i] and A[j] to the right of the equal sign in expression (1), and the parameter A[j] to the right of the equal sign in expression (2) may indicate the current activation value, whereas the parameters A[j] to the left of the equal signs in both expressions (1) and (2) may indicate the newly calculated activation value. In this regard, the parameters A[i] and A[j] are time-based.

Figure 4:
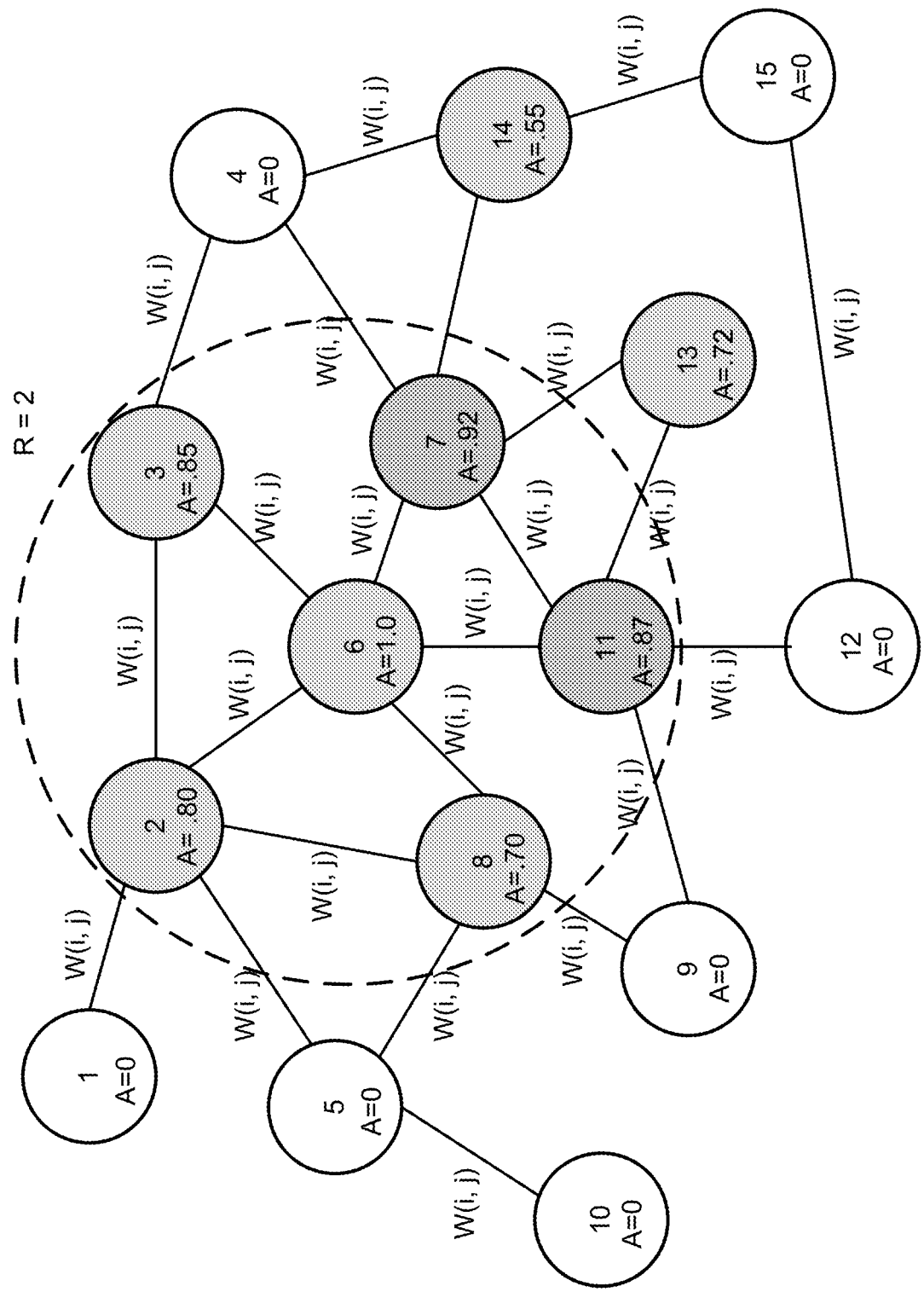
FIG. 4 is a diagram illustrating an exemplary process of the priming-based search and discovery service based on a distance parameter.

According to an exemplary implementation, if A[j] is higher than a firing threshold "F", then A[j] is included in a search result. For example, the parameter "F" may be assigned a value within a real number range (e.g., [0.0 . . . 1.0]) or other configurable numerical range. According to another exemplary implementation, a distance parameter "R" may define a distance between node "i" and node "j", where j∈Set node "i" if Distance (i,j)<R, such that when this condition is satisfied, expression (1) is used, else expression (2). As an example, R may indicate a maximum hop count between the two nodes (i.e., node "i" and node "j"). Depending on whether the hop count between node "i" and node "j" is less than the hop count of value R, a binary choice between expression (1) or expression (2) is provided. By way of further example, as illustrated in FIG. 4, if R=2, then nodes that are within 1 hop count from node 6 (indicated by the circle) and there is an edged-path between the node and node 6, expression (1) may be used. Otherwise, when both of these conditions are not satisfied, expression (2) may be used to calculate the activation value of the node. Based on the combination of these criteria, the search space within the metadata (e.g., graph 200) and utilization of processing resources may be minimized to obtain a search result. Additionally, the combination of these criteria attunes the search toward contents that may be more aligned to the interest of the user at the time in view of the primed nodes and their corresponding activation values.

Figure 5A:
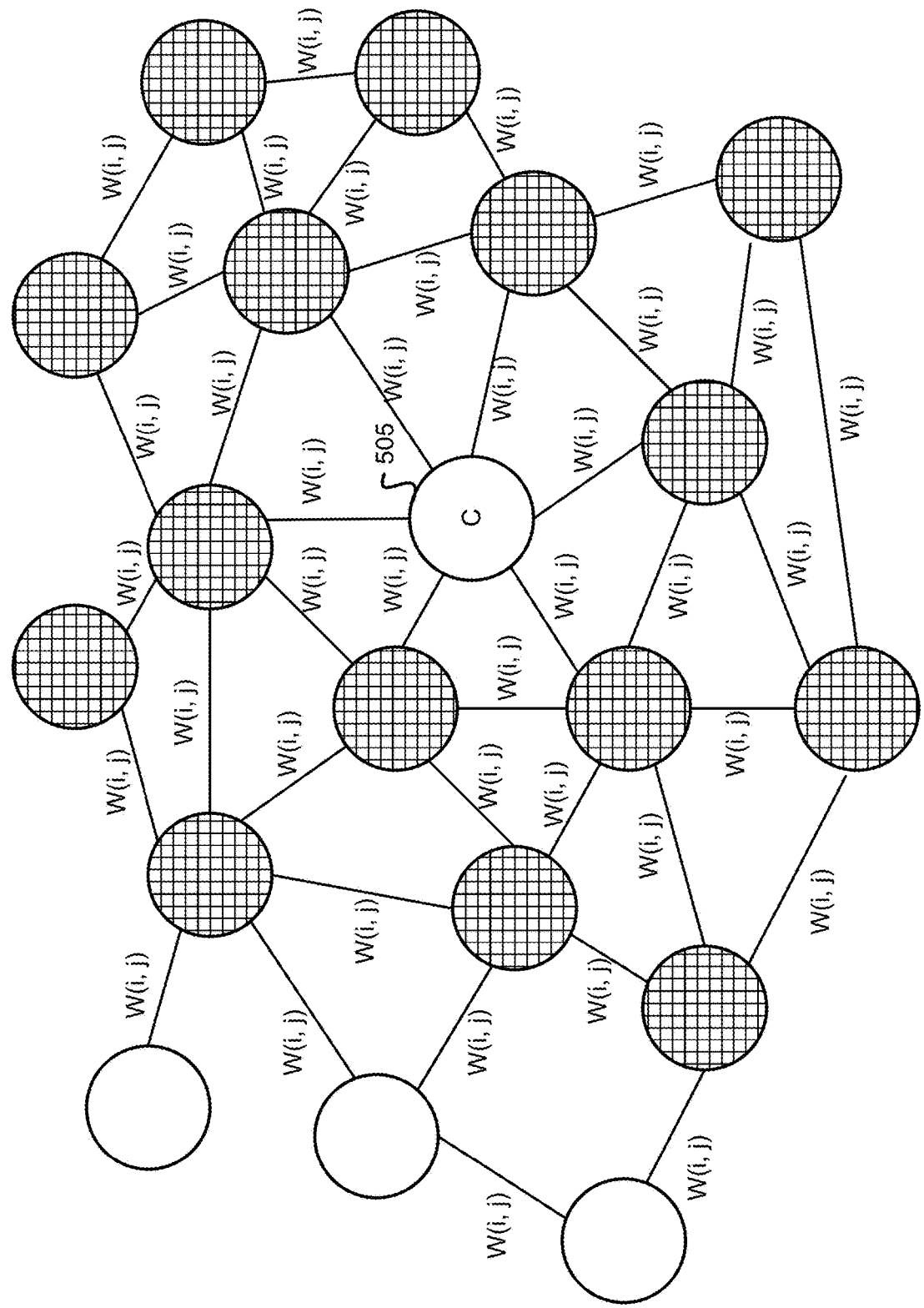
FIGS. 5A and 5B are diagrams illustrating another exemplary process of the priming-based search and discovery service.

According to an exemplary embodiment of the context or entity-based priming, search and discovery device 115 includes logic that provides a center of priming function. According to an exemplary implementation, the center of priming function may be implemented based on the following exemplary expression:

$$C_1 = S(C_0) = \text{ArgMax}(\text{ActivationValueFunction}(C_0, \text{Phrase})) \quad (3),$$

in which expression (1) is used to calculate the activation value for all nodes "i" that are within parameter "R" of the original center of priming $C_0$. That is, the ActivationValueFunction of expression (3) corresponds to expression (1). The new center of priming is $C_1$. For example, referring to FIG. 5A, the center of priming function may select a node $C_0$ that has a maximum activation value, from among other nodes, based on expression (3). In FIG. 5A, a center of priming node 505, which is labeled with a "C", is illustrated. According to an exemplary implementation, the activation values of nodes "j" that are connected to center of priming node 505 and satisfied the value R (e.g., a hop count of 2) may be calculated based on the following exemplary expressions:

$$A[j] = (A[j] + A[i]*W[i,j]*\text{RelevanceScore}(\text{Phrase},j)) \text{ if } j \in \text{Set node "i"} \quad (4)$$

$$A[j] = 0 \text{ if } j \notin \text{Set node "i"} \quad (5)$$

According to such an exemplary implementation, the parameter A[i] indicates an activation value associated with node "i", and the parameter A[j] indicates an activation value associated with node "j". The parameter W[i,j] indicates a weighted value associated with an edge between node "i" and node "j", and is further described in relation to FIG. 2 and elsewhere. The function RelevanceScore(Phrase, j) is the user and context independent set of results for a given phrase (e.g., search term) relative to node "j". The parameters A[i] and A[j] to the right of the equal sign in expression (4), and the parameter A[j] to the right of the equal sign in expression (5) may indicate the current activation value, whereas the parameters A[j] to the left of the equal signs in both expressions (4) and (5) may indicate the newly calculated activation value. In this regard, the parameters A[i] and A[j] are time-based.

Figure 5B:
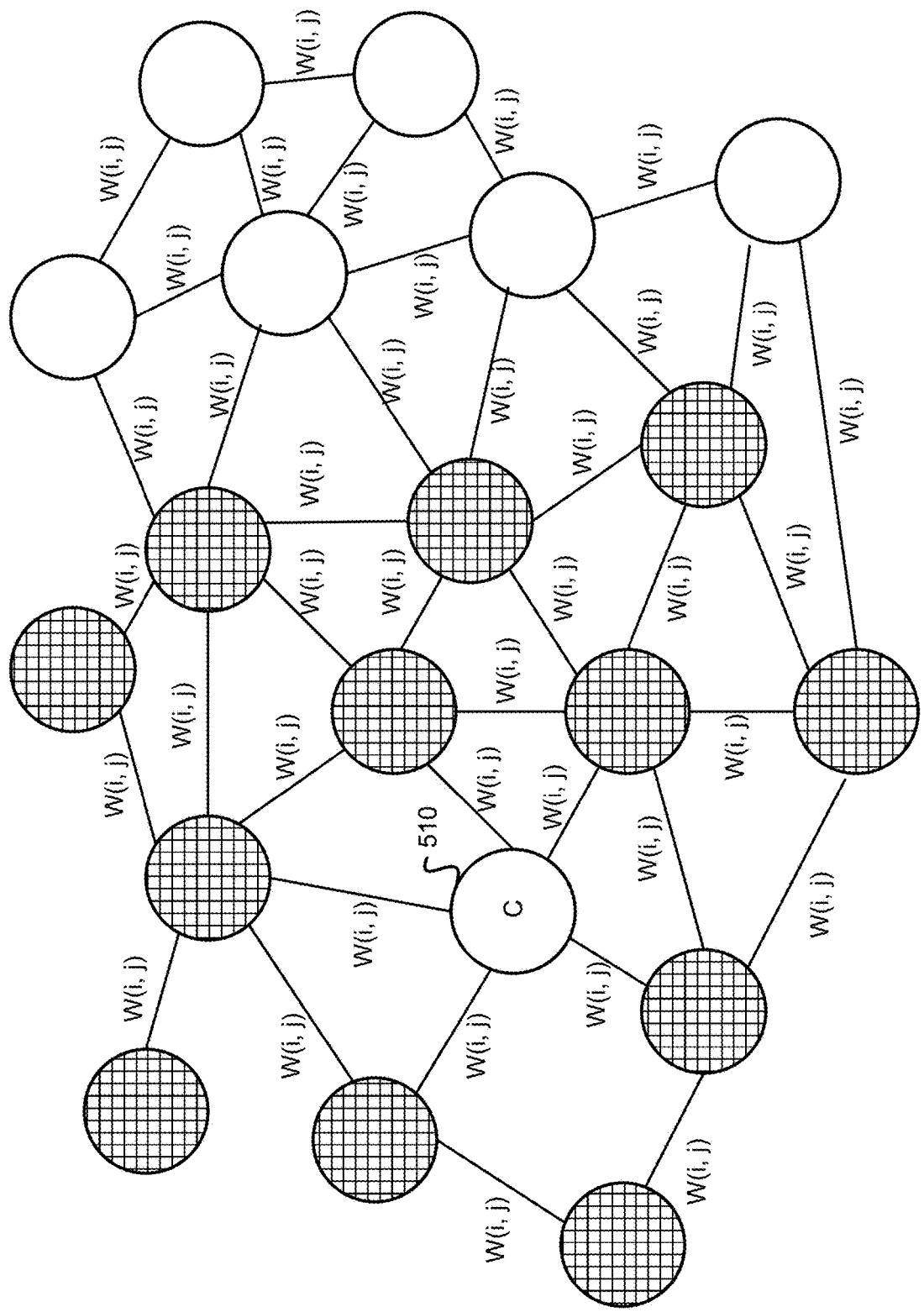

Nodes "j" are illustrated in FIG. 5A by way of a hatch pattern. Referring to FIG. 5B, subsequent to receiving a second search term from the user, the center of priming function may select a node $C_1$ that has a maximum activation value, from among other nodes, based on expression (3). In FIG. 5B, a center of priming node 510, which is labeled with a "C", is illustrated. The activation values of nodes "j" that are connected to center of priming node 510 and satisfied the value R (e.g., a hop count of 2) may be calculated based on expression (4). Nodes "j" are illustrated in FIG. 5B by way of a hatch pattern.

Figure 5C:
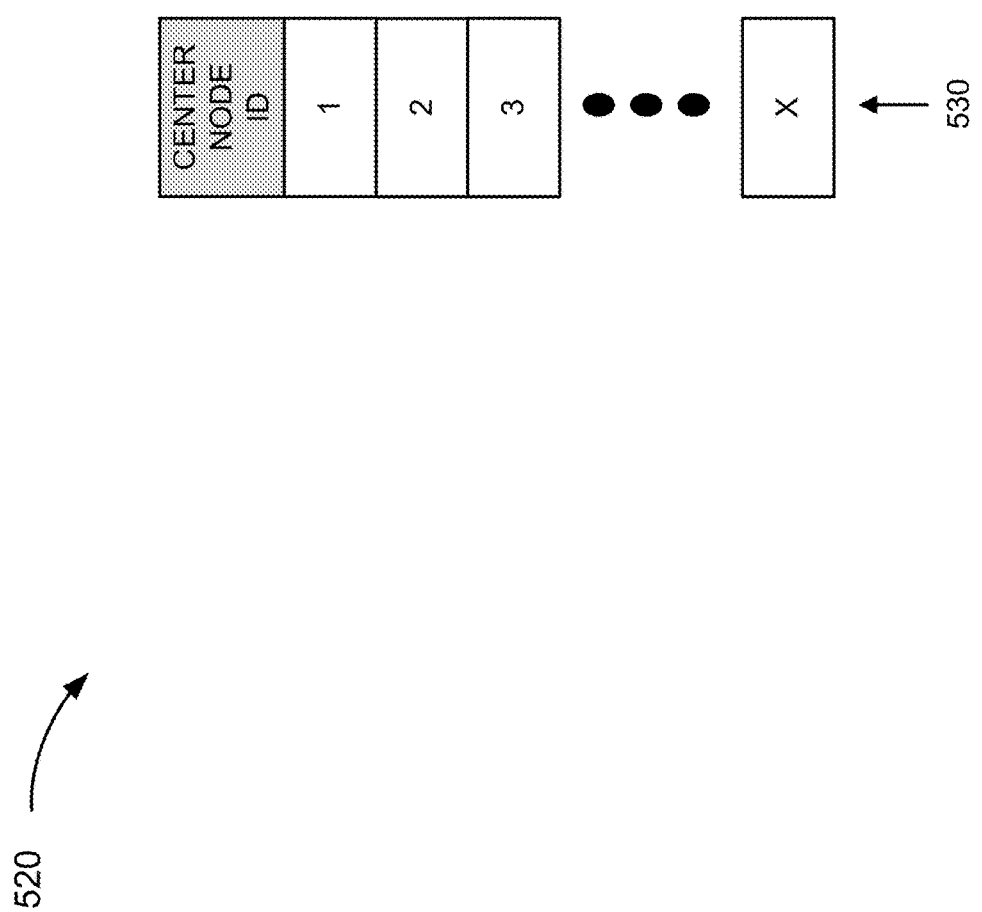
FIG. 5C is a diagram illustrating an exemplary data structure that may be used to store an exemplary embodiment of user center of priming information.

FIG. 5C is a diagram illustrating an exemplary implementation in which user center of priming information may be stored. For example, the user center of priming information may be stored in a list 520. List 520 may include a center node identifier 530 that identifies a center of priming node that is primed in the user's mind at a given time. The center of priming nodes and corresponding properties included in the user center of priming information of a user typically include a subset of the all the nodes and corresponding properties included in the metadata (e.g., graph 200). During a search process (e.g., as the user provides a search term to be used to conduct a search), nodes that are selected to be center of priming nodes may be included in the user center of priming information.

The user center of priming information may indicate multiple centers of priming at any given time and/or multiple contexts. The user center of priming information may also be implemented as a multi-level priming data structure. For example, the user center of priming information of a user may implemented in a multi-level priming hierarchy (e.g., a hierarchical tree) in which the user has a tree of centers of priming. During a search and discovery process, the search and discovery system may jump to any center of priming of the multi-level priming hierarchy which allows the user to traverse different sub-graphs of metadata and corresponding discovery of different contents that match the user's interest at any given time. Additionally, different users and user profiles may have different centers of priming that vary their context in the metadata, which may personalize their content discovery based on their traversal through the metadata.

User profile device 120 includes a network device that stores user profile information pertaining to users of the content service. For example, the user profile information may include user mind activation information of a user, which supports the activation threshold-based priming of the search and discovery service, as described herein. The user profile information may include user center of priming information of the user, which supports the context or entity-based priming of the search and discovery service, as described herein.

The user profile information may include other types of information. For example, the user profile information may include historical information pertaining to the user, such as information pertaining to previous searches (e.g., search terms, selections of candidate contents in search results, and/or other forms of navigation tracking), and contents viewed. The user profile information may also include user group information. The user group information may indicates a user group to which the user belongs based on criteria associated with the use of the content service that is in common with or similar to other users of the content service. As described further below, the user group information may be used to prime metadata. Additionally, for example, the user profile information may include demographic information of the user, a user identifier of the user, and user preference information. For example, the user may set various parameter values pertaining to the priming-based discovery service, as described herein, and/or indicate a preference between the activation threshold-based priming and the context or entity-based priming.

Although not illustrated, content network 105 may include other types of network devices that provide various content services, such as a content processing device (e.g., transcoding, encryption, etc.), a digital rights management device, a licensing device, a login device (e.g., authentication, authorization, etc.), a billing device, and a content server device.

Network 140 includes one or multiple networks of one or multiple types. For example, network 140 may be implemented to include a terrestrial network, a content delivery network, a wireless network, a wired network, an optical network, a radio access network, a core network, a packet network, an Internet Protocol (IP) network, the Internet, the World Wide Web, a private network, a public network, a television distribution network, a streaming network, a mobile network, and/or other type of network that provides access to content network 105.

User device 150 includes a device that has computational and communication capabilities. User device 150 may be implemented as a mobile device, a portable device, or a stationary device. By way of further example, user device 150 may be implemented as a smartphone, a personal digital assistant, a tablet, a netbook, a phablet, a wearable device, a set top box, an infotainment system in a vehicle, a smart television, a game system, a music playing system, a computer (e.g., a desktop, a laptop, etc.), or some other type of user device. According to various exemplary embodiments, user device 150 may be configured to execute various types of software (e.g., applications, programs, etc.). The number and the types of software may vary among user devices 150. According to an exemplary embodiment, user device 150 includes software that provides access to and use of the content service, which includes the priming-based search and discovery service, as described herein. For example, the software may be implemented as a browser, a mobile application, or other type of client application.

Figure 2:
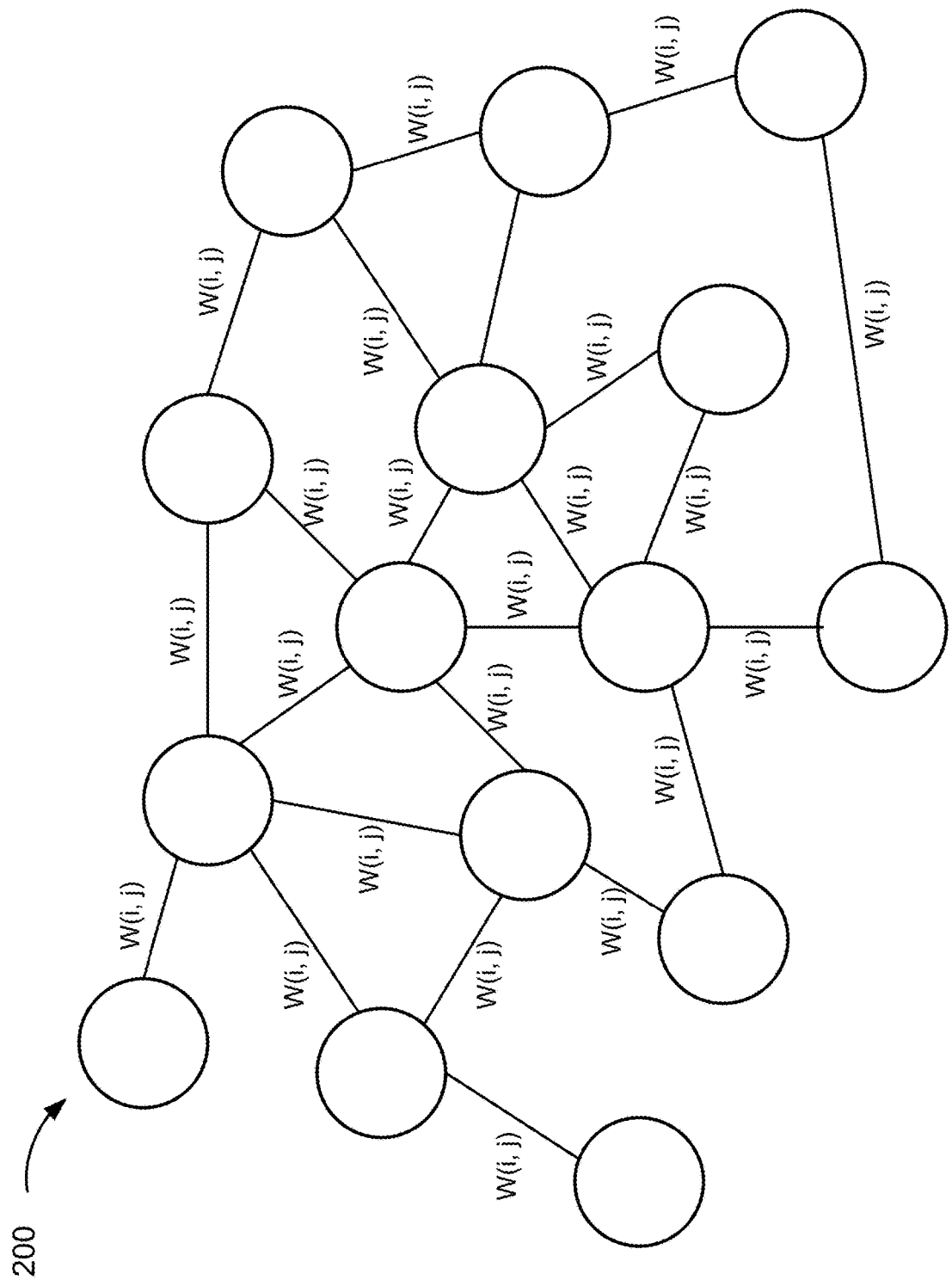
FIG. 2 is a diagram illustrating an exemplary data structure that may be used to store an exemplary embodiment of content metadata.

FIG. 2 is a diagram illustrating an exemplary implementation in which the metadata may be stored. For example, the metadata may be stored in a graph 200. For example, graph 200 may be implemented as a weighted graph. As illustrated, graph 200 includes nodes or vertices (illustrated as circles) that may be connected to other nodes via edges (illustrated as lines). According to an exemplary embodiment, a node may indicate a property pertaining to a content. For example, the node may indicate an instance of metadata of the content, such as a title of a movie, a name of a person, or some other type of concept or tag that pertains to and can be associated with the content. According to an exemplary embodiment, an edge indicates a relationship between to two nodes that are directly connected. According to an exemplary embodiment, the edge is weighted. For example, the edge is assigned a weight that indicates a strength of linkage, correlation, and/or similarity, between the two nodes based on the properties of each node. By way of example, as illustrated in FIG. 2, a weight between a node "i" and a node "j" may have a weighted value of $W(i, j)$. According to an exemplary embodiment, when graph 200 may be implemented as an undirected weighted graph, an edge may be assigned a single weighted value. According to other exemplary embodiments, when graph 200 may be implemented as a directed graph, each directed edge between two nodes may have a weighted value, which may be the same value or a different value.

As previously described, given the massive number of instances of metadata that may be stored in relation to contents, the number and arrangement of nodes illustrated in FIG. 2 is exemplary, as well as the number and arrangement of the edges. Additionally, the type of graphs discussed in which the metadata may be stored is merely exemplary. According to other exemplary embodiments, other types of graphs (e.g., a multilevel graph, a hierarchical graph, etc.) may be used to store the metadata in support of the priming-based search and discovery service. Additionally, as previously described, according to still other exemplary embodiments, the metadata may be stored in a structure or an entity different from a graph (e.g., a database, a graph database, a table, or other type of data structure and/or information base).

FIG. 3A is a diagram illustrating an exemplary implementation in which user mind activation information may be stored. For example, the user mind activation information may be stored in a list 300. List 300 may include a node identifier 305 that correlates to a weight 310. The user mind activation information may indicate how much the property of a node is primed in the user's mind at a given time in which node identifier 305 indicates the node and/or the corresponding property, and weight 310 indicates an activation weighted value, which represents a degree of priming, that is correlated to the node/property.

Figure 3B:
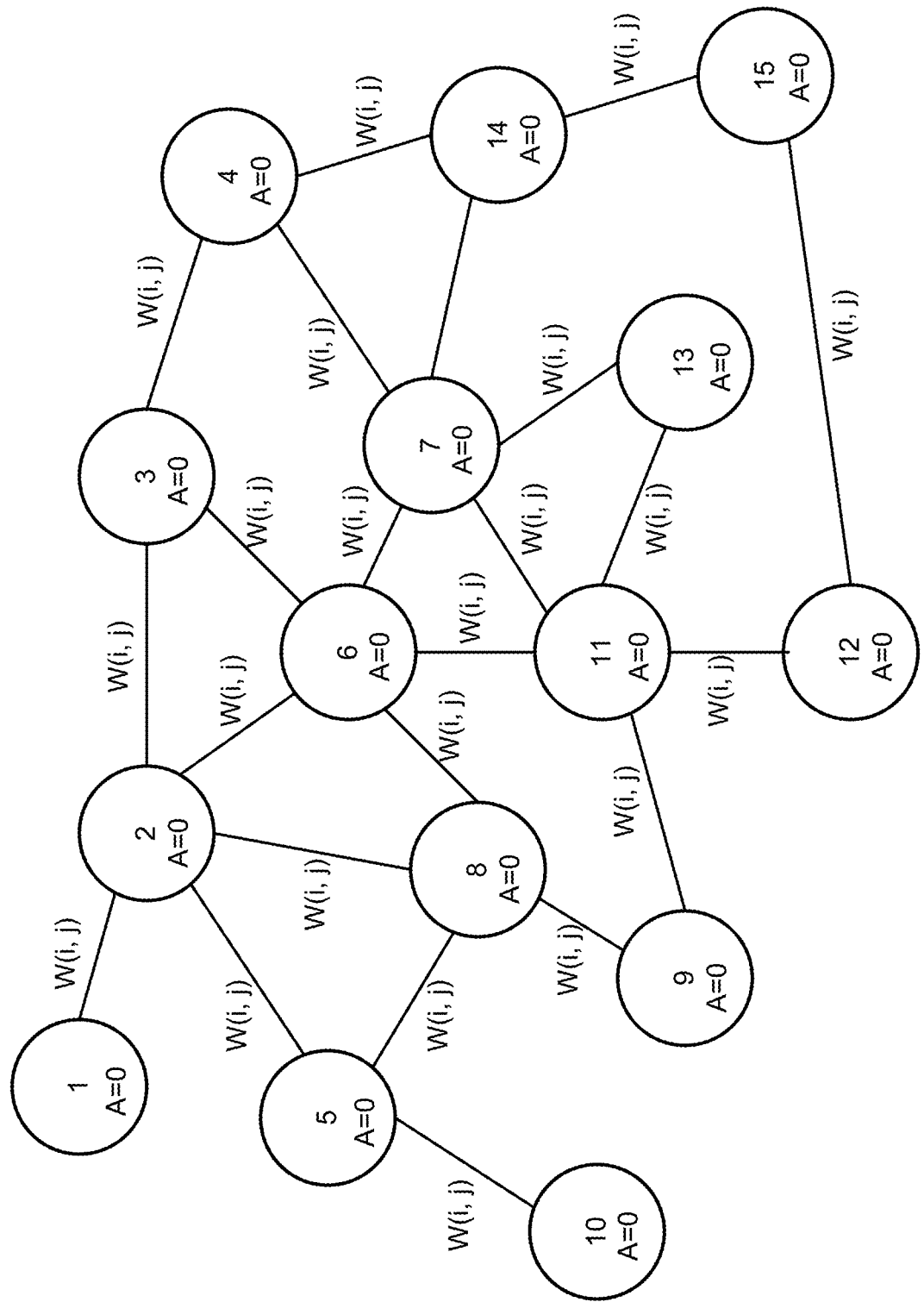
FIGS. 3B and 3C are diagrams illustrating an exemplary process of the priming-based search and discovery service.
Figure 3C:
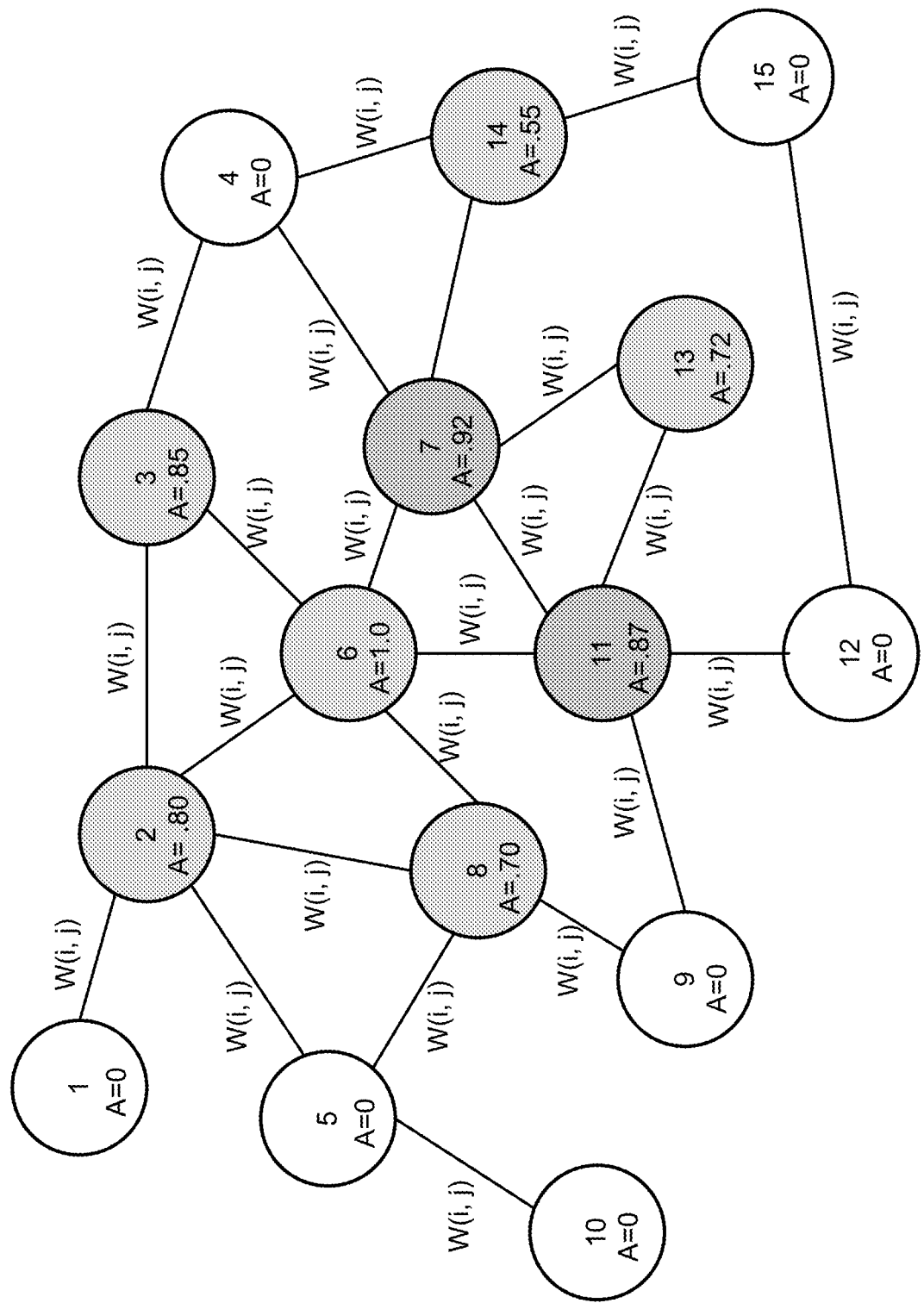

The nodes and corresponding properties included in the user mind activation information of a user typically include a subset of the all the nodes and corresponding properties included in the metadata (e.g., graph 200). According to an exemplary embodiment, the activation weighted values for all nodes in the graph are initially assigned an activation weighted value of 0 for a user. During a search process (e.g., as the user provides a search term to be used to conduct a search), nodes that are primed based on the search term may be included in the user mind activation information along with their corresponding activation weighted values (e.g., greater than 0). FIGS. 3B and 3C illustrate this process. For example, referring to FIG. 3B, a graph that stores metadata is illustrated in which the nodes have been numbered for purposes of discussion. According to an exemplary scenario, nodes 1-15 may have initial activation weighted values of 0. Thereafter, a user may begin a search and provide a search term. Referring to FIG. 3C, based on the search term and a spreading activation function, which includes logic that calculates activation weighted values, nodes 2, 3, 6, 7, 8, 11, 13, and 14, may have activation weighted values greater than 0. According to this example, nodes 2, 3, 6, 7, 8, 11, 13, and 14 may be included in list 300, along with their activation weighted values. According to this example, the range of activation weighted values is between 0 and 1. According to another exemplary embodiment, a node selected to be included in the user mind activation information may be a node whose activation weighted value is greater than a threshold value (e.g., a value greater than 0). The activation weighted values described in relation to FIG. 3C are exemplary. According to other exemplary implementations, the activation weighted values may have different values and/or values within a different range.

According to other exemplary embodiments, certain nodes may be pre-primed with activation weighted values greater than 0, before a search is performed by the user, based on various criteria. For example, the criteria may include historical searches performed by the user, demographic information pertaining to the user, and/or a grouping of the user with other users that may share a commonality (e.g., demographically, common search terms, the same or similar contents viewed, the same or similar ratings of contents viewed, etc.).

FIGS. 6A-6E are diagrams illustrating an exemplary process of the priming-based search and discovery service. It may be assumed that user 160 has successfully logged into the content service. Additionally, it may be assumed that search and discovery device 115 has obtained user profile information of user 160. According to this exemplary scenario, the user mind activation information of user 160 may be empty, and search and discovery device 115 may not initialize the metadata of contents. According to other exemplary scenarios, as previously described, the user mind activation information of user 160 may indicate nodes and activation weights information that may be used to initialize the metadata of contents before a search term is received from user 160.

Figure 6B:
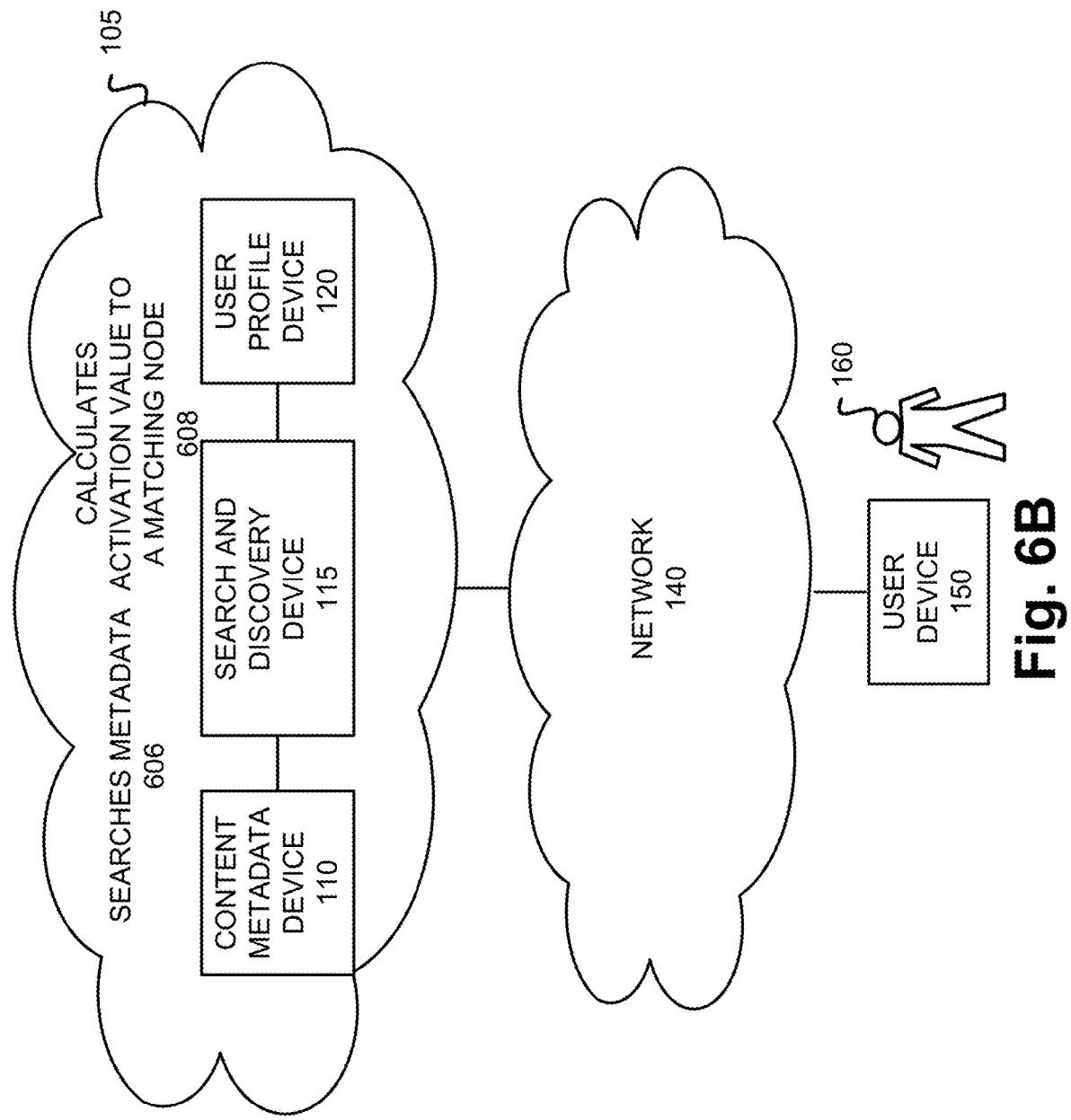

Referring to FIG. 6A, search and discovery device 115 provides a user interface 602 that allows user 160 via user device 150 to search for contents. Subsequent to the presentment of the user interface, search and discovery device 115 may receive a search term 604 from user 160. For example, the search term may include one or multiple words. Referring to FIG. 6B, search and discovery device 115 may search the metadata of contents 606 stored in content metadata device 110. For example, search and discovery device 115 may include logic that attempts to match (e.g., exactly, best-match) of a word included in the search term with instances of metadata associated with the nodes of graph 200. According to this exemplary scenario, search and discovery device 115 discovers one or more nodes that match the one or more nodes included in the search term. Search and discovery device 115 calculates an activation value for each node that matches the search term 608. For purposes of description, each matching node may be considered a node "i". According to an exemplary implementation, the activation value for each matching node may be a highest activation value relative to a range of possible activation values. For example, when the range of activation values is between 0 and 1, a matching node may be assigned an activation value of 1.

Referring to FIG. 6C, search and discovery device 115 identifies all nodes "j" based on the R parameter 610. For example, search and discovery device 115 may identify all nodes "j" that are connected to node "i" and are within a maximum distance from node "i", as previously described. Search and discovery device 115 may calculate an activation value 612 for nodes "j" that satisfy this criteria based on expression (1), and for nodes "j" that do not satisfy this criteria based on expression (2). Search and discovery device 115 may group nodes "i" and nodes "j", which satisfy the criteria, in a set 614.

Referring to FIG. 6D, search and discovery device 115 may compare the activation values associated with the nodes in the set with a result threshold value 616. For example, activation values that satisfy the result threshold value may indicate that those nodes (or titles associated with the nodes) are to be included in the search result that is presented to user 160. On the other hand, activation values that do not satisfy the result threshold value may indicate that those nodes are not to be included in the search result. Based on the result of the comparison, search and discovery device 115 may select titles of contents based on the nodes in the set that satisfied the result threshold value 618.

Referring to FIG. 6E, search and discovery device 115 may compare the activation values of the nodes in the set to a minimum result threshold value. Those nodes that satisfy the minimum result threshold value, the node identifier and activation weights may be stored in the user mind activation information 620. Search and discovery device 115 may present a search result that includes the selected titles of contents. Search and discovery device 115 may rank the selected titles of contents based on their activation values.

Figure 6F:
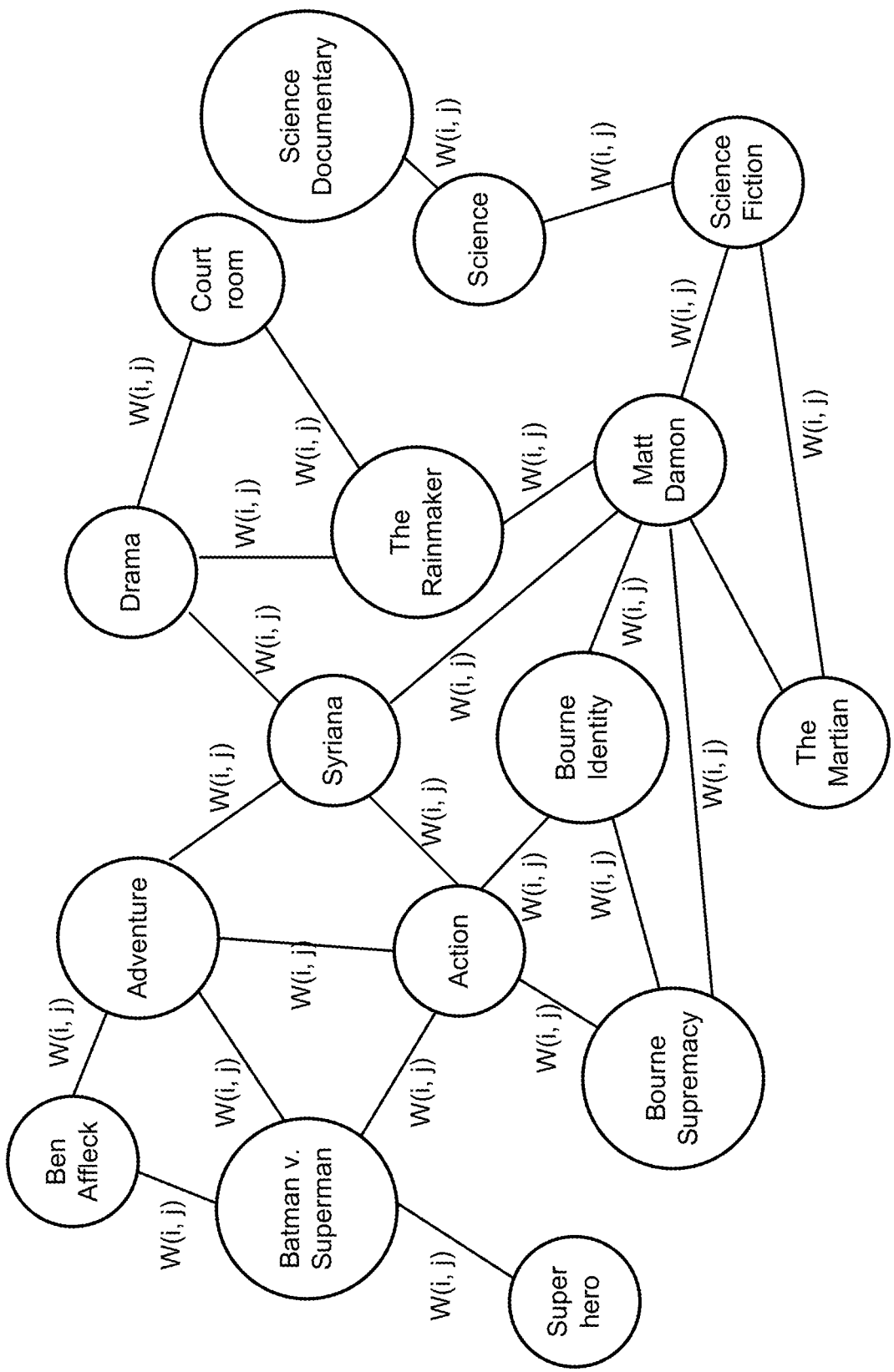
FIG. 6F is a diagram illustrating exemplary content metadata according to another exemplary scenario.

As previously described, the priming-based search and discovery of contents may be iterative. For example, referring to FIG. 6F, which illustrates exemplary metadata, and FIGS. 3B, 3C, 4, and 6A-6E, assume user 160 uses the search term "adventure" and the unprimed search results include action movies and shows, and each of search results, associated actors, and tags (e.g., adventure) may be added to the user mind activation information. Subsequently, user 160 uses the search term "science" and the activation starts from nodes of the previous search results. The search and discovery service may identify nodes pertaining to "science fiction", "science documentaries," and specific "science fiction" movies and actors connected to such contents. Thereafter, user 160 uses the search term "Damon" and activation may include a title node "The Martian" and an actor node "Matt Damon." According to this exemplary scenario, "The Martian" and "Matt Damon" were readily primed due to previous searches, and hence the search and discovery service may also select a title node "Bourne Identity", which also featured "Matt Damon."

According to other exemplary embodiments, the process described and illustrated in FIGS. 6A-6E may include additional operations, fewer operations, and/or different operations.

FIG. 7 is a diagram illustrating exemplary components of a device 700 that may be included in one or more of the devices described herein. For example, device 700 may correspond to components included in network devices of content network 105 and user device 150. As illustrated in FIG. 7, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, clocks, and so forth.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc.

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include drives for reading from and writing to the storage medium.

Memory/storage 715 may be external to and/or removable from device 700, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. As an example, with reference to network devices of content network 105, software 720 may include an application that, when executed by processor 710, provides the functions of the priming-based search and discovery service, as described herein. Software 720 may also include firmware, middleware, microcode, hardware description language (HDL), and/or other form of instruction. Software 720 may further include an operating system (OS) (e.g., Windows, Linux, Android, proprietary, etc.).

Communication interface 725 permits device 700 to communicate with other devices, networks, systems, and/or the like. Communication interface 725 includes one or multiple wireless interfaces and/or wired interfaces. For example, communication interface 725 may include one or multiple transmitters and receivers, or transceivers. Communication interface 725 may operate according to a protocol stack and a communication standard. Communication interface 725 may include an antenna. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a touchscreen, a touchless screen, a button, a switch, an input port, speech recognition logic, and/or some other type of visual, auditory, tactile, etc., input component. Output 735 permits an output from device 700. For example, output 735 may include a speaker, a display, a touchscreen, a touchless screen, a light, an output port, and/or some other type of visual, auditory, tactile, etc., output component.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8A:
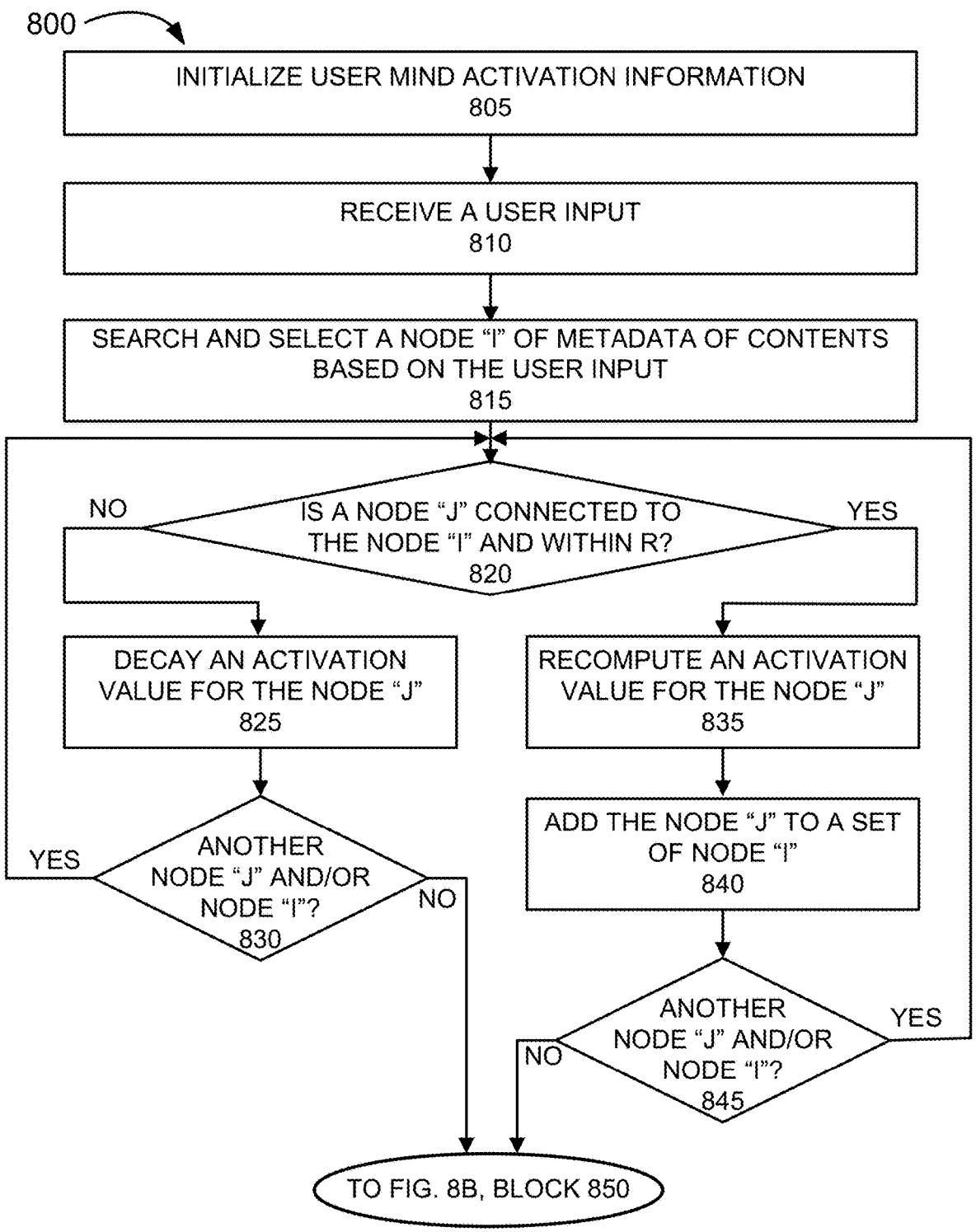
FIGS. 8A and 8B are flow diagrams illustrating an exemplary process of an exemplary embodiment of the priming-based search and discovery service based on activation threshold-based priming.
Figure 8B:
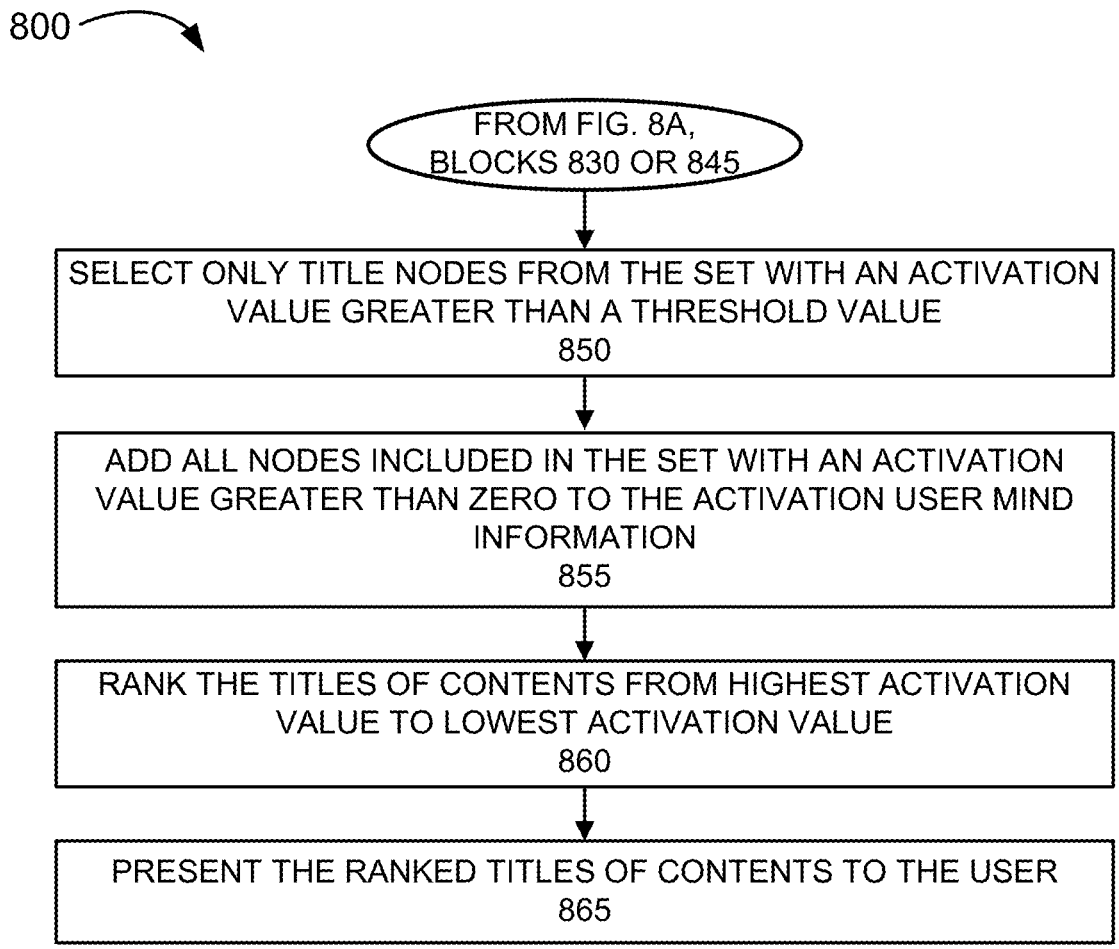

FIGS. 8A and 8B are flow diagrams illustrating an exemplary process 800 of an exemplary embodiment of the priming-based search and discovery service based on activation threshold-based priming. Process 800 is directed to a process previously described with respect to FIGS. 2, 3A-3C, as well as elsewhere in this description, in which the priming-based search and discovery service is provided. According to an exemplary embodiment, a network device (e.g., search and discovery device 115) performs steps of process 800. For example, processor 710 executes software 720 to perform the steps illustrated in FIGS. 8A and 8B, and described herein.

According to an exemplary scenario, it may be assumed that user 160 via user device 150 establishes a session with the content service of content network 105. User 160 may log into the content service by providing credentials (e.g., username and password) via a user interface. The content service determines that the credentials are valid. User 160 may navigate to a user interface of search and discovery device 115 via which user 160 may search for contents.

Referring to FIG. 8A, in block 805, user mind activation information may be initialized. For example, search and discovery device 115 may obtain the user mind activation information from user profile device 120 based on account information associated with the logged user 160. According to an exemplary implementation, the user mind activation information (e.g., list 200) may be empty. According to another exemplary implementation, the user mind activation information may be pre-primed with node and activation weight information based on a user group to which user 160 belongs, as previously described. According to yet another exemplary implementation, the user mind activation information may be pre-primed with node and activation weight information based on historical information associated with only user 160. The metadata of contents (e.g., graph 200) may be initialized based on the user mind activation information.

In block 810, a user input may be received. For example, search and discovery device 115 may receive a search term via the user interface. The search term may include one or multiple words.

In block 815, metadata of contents may be searched and selected based on the user input. For example, search and discovery device 115 may match each word and/or phrase (e.g., multiple words) with the nodes of the metadata (e.g., graph 200). The matching of a word and/or phrase may be an exact match or best match (e.g., not exact). The nodes of the metadata that match the user input may be considered a node "i" and included in a set. According to an exemplary implementation, when the user mind activation information indicates a node (versus an initialized user mind activation information that does not indicate a node (e.g., an empty list)), the node included in the user mind activation information may be considered a node "i" and included in the set.

In block 820, it may be determined whether a node "j" is connected to the node "i" and is within a parameter "R" value. For example, for each node "i", search and discovery device 115 may identify each node "j" that is connected to node "i" (e.g., edge) and is within a certain distance from node "i". According to an exemplary implementation, the "R" value may indicate a hop count from node to node. According to other exemplary implementations, the edges between nodes may vary in length (e.g., a length value) and be used to calculate distance relative to the "R" value. According to either of the implementations, search and discovery device 115 identifies and selects any node "j" that has a distance that satisfies the "R" value (e.g., <R, ≤R).

When it is determined that the node "j" is not connected to the node "i" and within the parameter "R" value (block 820—NO), an activation value of the node "j" is decayed (block 825). For example, search and discovery device 115 may reduce the activation value associated with node "j" based on a decay factor value. By way of further example, as previously described, search and discovery device 115 may use expression (2) of the spreading activation function to calculate and set the activation value for node "j" of the metadata.

In block 830, it is determined whether another node "j" and/or another node "i" is to be evaluated. For example, search and discovery device 115 may determine whether another node "j" is connected to the node "i" based on the set of node(s) "i" that were selected in block 815. Additionally, search and discovery device 115 may determine whether another (e.g., different) node "i" of the set of node(s) "i" needs to be evaluated.

When there is another node "j" and/or another node "i" (block 830—YES), then process 800 returns to block 820. When there is not another node "j" and/or another node "i" (block 830—NO), then process proceeds to block 850 of FIG. 8B.

When it is determined that the node "j" is connected to the node "i" and within the parameter "R" value (block 820—YES), an activation value for the node "j" is calculated (block 835). For example, search and discovery device 115 may increase or recalculate the activation value associated with node "j". By way of further example, as previously described, search and discovery device 115 may use expression (1) of the spreading activation function to calculate and set the activation value for node "j" of the metadata.

In block 840, the node "j" is added to the set of node "i." For example, search and discovery device 115 may add the node "j" to the set of node(s) "i".

In block 845, it is determined whether another node "j" and/or another node "i" is to be evaluated. For example, search and discovery device 115 may perform an operation similar to that described in block 830.

When there is another node "j" and/or another node "i" (block 845—YES), then process 800 returns to block 820. When there is not another node "j" and/or another node "i" (block 845—NO), then process proceeds to block 850 of FIG. 8B.

Referring to FIG. 8B, in block 850, only title nodes from the set with an activation value greater than a result threshold value may be selected. For example, search and discovery device 115 may identify only title nodes (e.g., versus other types of metadata instances, such as actor names, crew information, etc.) included in the set. Based on the identification, search and discovery device 115 may compare the activation value associated with each title node (e.g., node "i", node "j") in the set with the result threshold value. Based on a result of the comparison, search and discovery device 115 may determine whether the title of the content to which the title node pertains is or is not to be included in a search result. For example, when the activation value satisfies the result threshold value, the title of the content is included in the search result, and when the activation value does not satisfy the result threshold value, the title of the content is not included in the search result.

In block 855, all nodes included in the set with an activation value greater than zero may be added to the user mind activation information. For example, search and discovery device 115 may identify each node included in the set that has an activation value greater than zero. According to another exemplary implementation, the threshold value may be a value different from zero. Search and discovery device 115 may store the node (e.g., instance of metadata) and the activation weight in the activation user mind information (e.g., list 300).

In block 860, the titles of contents from highest activation value to the lowest activation value may be ranked. For example, search and discovery device 115 may rank the titles of contents, which are included in the search result, based on their activation values.

In block 865, the ranked titles of contents may be presented to the user. For example, search and discovery device 115 may present the search results to user 160 via the user interface. The search results may include one or more titles of one or more contents that may be ordered according to their ranking.

Although FIGS. 8A and 8B illustrate an exemplary process 800 of the priming-based search and discovery service, according to other embodiments, process 800 may include additional operations, fewer operations, and/or different operations than those illustrated in FIGS. 8A and 8B, and described herein. Process 800 may be iteratively performed. For example, subsequent to the presentment of the search result, user 160 may enter additional or new search terms. Process 800 may continue to block 805 or 810. Process 800 may end when user 160 exits the content service, selects content to view or download, and/or other user input (or lack thereof) that indicates a search process has ended.

According to various exemplary embodiments, a parameter of the priming-based search and discovery service may be configured by an administrator of the service provider or by the user (e.g., user 160). For example, the parameter may include whether or not the metadata is initialized with the user mind activation information, and a parameter that indicates the information stored in the user mind activation information (e.g., historical information of the user versus user group, etc.). Additionally, or alternatively, the parameter may include the value of parameter "R." Depending on the value of "R", the search space, time of search, resource utilization, etc., may be increased or decreased. Additionally, or alternatively, the parameter may include the value of the result threshold value. Depending on the value of the result threshold value, the search results may include additional or fewer titles of contents. Additionally, or alternatively, other parameters described herein may be configured by the administrator or the user. As previously described, the configuration of the parameters, by the user, may be stored in user profile information (e.g., as a user preference).

Figure 9A:
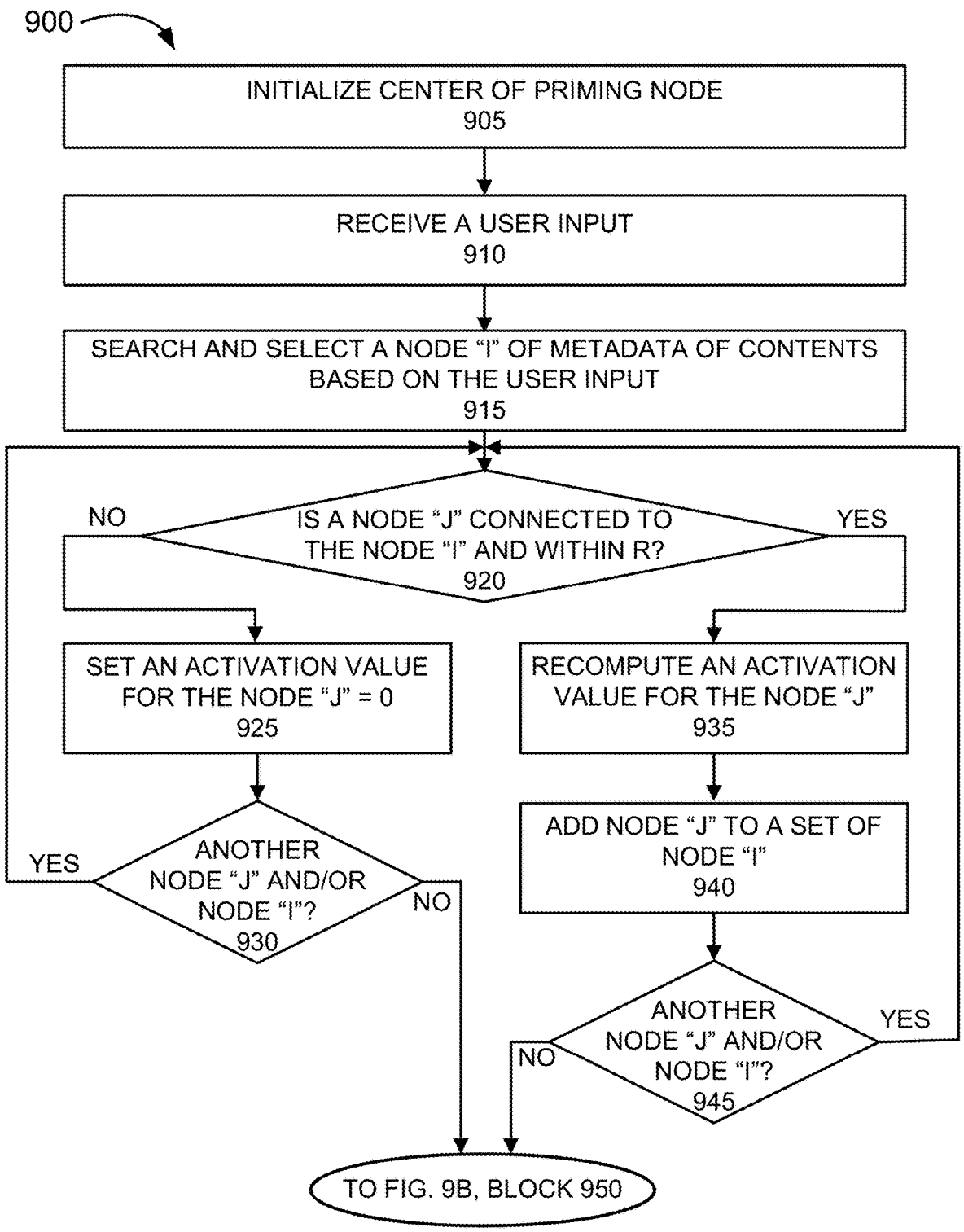
FIGS. 9A and 9B are flow diagrams illustrating another exemplary process of an exemplary embodiment of the priming-based search and discovery service based on content or entity-based priming.
Figure 9B:
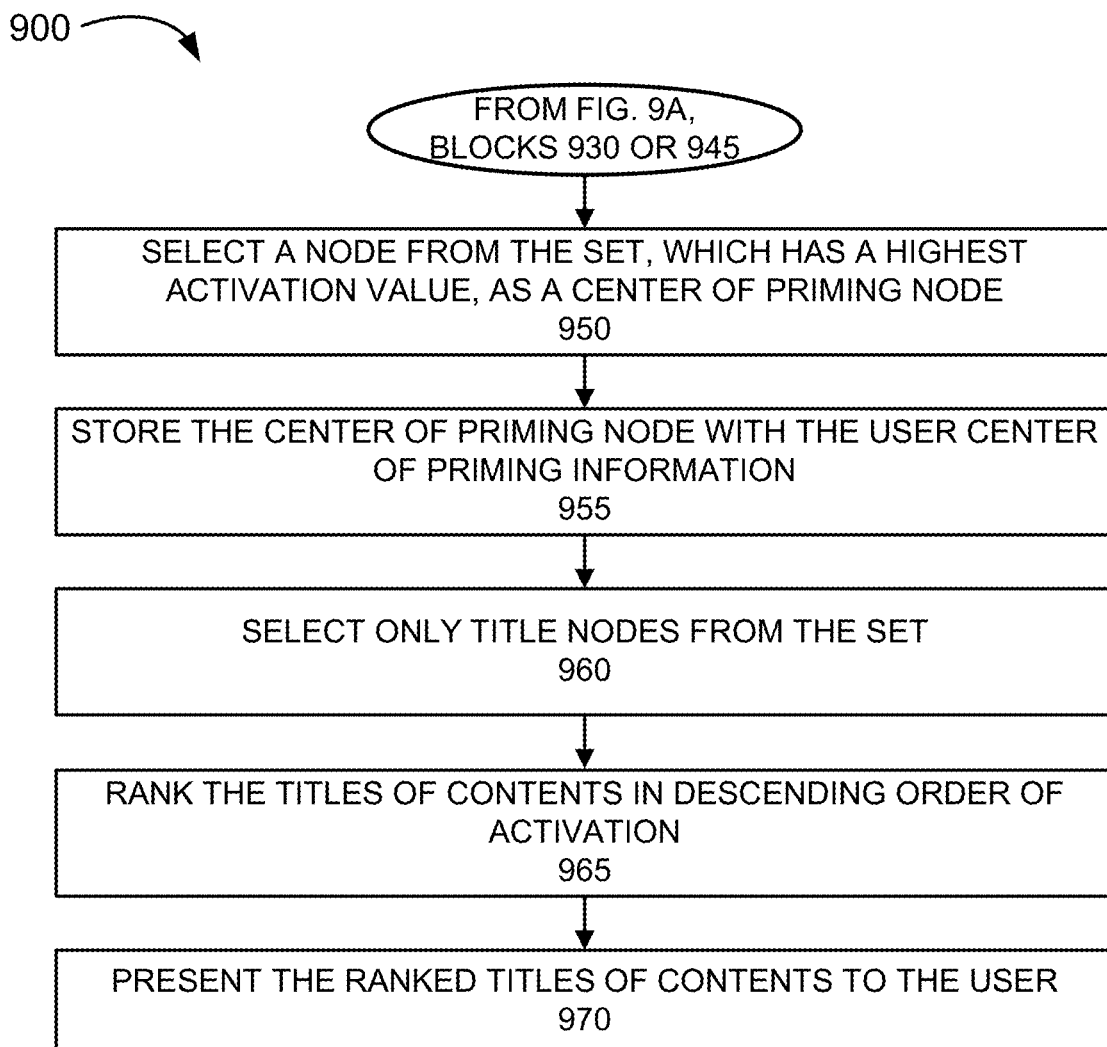

FIGS. 9A and 9B are flow diagrams illustrating an exemplary process 900 of an exemplary embodiment of the priming-based search and discovery service based on context or entity-based priming. Process 900 is directed to a process previously described with respect to FIGS. 2, 5A-5C, as well as elsewhere in this description, in which the priming-based search and discovery service is provided.

According to an exemplary embodiment, a network device (e.g., search and discovery device 115) performs steps of process 900. For example, processor 710 executes software 720 to perform the steps illustrated in FIGS. 9A and 9B, and described herein.

According to an exemplary scenario, it may be assumed that user 160 via user device 150 establishes a session with the content service of content network 105. User 160 may log into the content service by providing credentials (e.g., username and password) via a user interface. The content service determines that the credentials are valid. User 160 may navigate to a user interface of search and discovery device 115 via which user 160 may search for contents.

Referring to FIG. 9A, in block 905, user center of priming information may be initialized. For example, search and discovery device 115 may obtain the user center of priming information from user profile device 120 based on account information associated with the logged user 160. According to an exemplary implementation, the user center of priming information (e.g., list 520) may be empty. According to another exemplary implementation, the user center of priming information may be pre-primed with one or multiple nodes based on a user group to which user 160 belongs, as previously described. According to yet another exemplary implementation, the user center of priming information may be pre-primed with one or multiple nodes based on historical information associated with only user 160. The metadata of contents (e.g., graph 200) may be initialized based on the user center of priming information.

In block 910, a user input may be received. For example, search and discovery device 115 may receive a search term via the user interface. The search term may include one or multiple words.

In block 915, metadata of contents may be searched and selected based on the user input. For example, search and discovery device 115 may match each word and/or phrase (e.g., multiple words) with the nodes of the metadata (e.g., graph 200). The matching of a word and/or phrase may be an exact match or best match (e.g., not exact). The nodes of the metadata that match the user input may be considered node "i". According to an exemplary implementation, when the user center of priming information indicates a node (versus an initialized user center of priming information that does not indicate a node (e.g., an empty list)), the node included in the user center of priming information may be considered a node "i" and included in the set.

In block 920, it may be determined whether a node "j" is connected to the node "i" and is within a parameter "R" value. For example, for each node "i", search and discovery device 115 may identify each node "j" that is connected to node "i" (e.g., edge) and is within a certain distance from node "i". According to an exemplary implementation, the "R" value may indicate a hop count from node to node. According to other exemplary implementations, the edges between nodes may vary in length (e.g., a length value) and be used to calculate distance relative to the "R" value. According to either of the implementations, search and discovery device 115 identifies and selects any node "j" that has a distance that satisfies the "R" value (e.g., <R, ≤R).

When it is determined that the node "j" is not connected to the node "i" and within the parameter "R" value (block 920—NO), an activation value of the node "j" is calculated (block 925). For example, search and discovery device 115 may set the activation value of the node "j" to zero or other value representing the lowest activation value based on expression (5).

In block 930, it is determined whether another node "j" and/or another node "i" is to be evaluated. For example, search and discovery device 115 may determine whether another node "j" is connected to the node "i" based on the set of node(s) "i" that were selected in block 915. Additionally, search and discovery device 115 may determine whether another (e.g., different) node "i" of the set of node(s) "i" needs to be evaluated.

When there is another node "j" and/or another node "i" (block 930—YES), then process 900 returns to block 920. When there is not another node "j" and/or another node "i" (block 930—NO), then process proceeds to block 950 of FIG. 9B.

When it is determined that the node "j" is connected to the node "i" and within the parameter "R" value (block 920—YES), an activation value for the node "j" is calculated (block 935). For example, search and discovery device 115 may calculate the activation value associated with node "j". By way of further example, as previously described, search and discovery device 115 may use expression (4) of the spreading activation function to calculate and set the activation value for node "j" of the metadata.

In block 940, the node "j" is added to the set of node "i." For example, search and discovery device 115 may add the node "j" and activation value to the set of node(s) "i".

In block 945, it is determined whether another node "j" and/or another node "i" is to be evaluated. For example, search and discovery device 115 may perform an operation similar to that described in block 930.

When there is another node "j" and/or another node "i" (block 945—YES), then process 900 returns to block 920. When there is not another node "j" and/or another node "i" (block 945—NO), then process proceeds to block 950 of FIG. 9B.

Referring to FIG. 9B, in block 950, a center of priming node may be selected from the set based on a node having a highest activation value. For example, search and discovery device 115 may select the node in the set based on expression (3).

In block 955, the center of priming node may be added to the user center of priming information. For example, search and discovery device 115 may store the node (e.g., instance of metadata) in the user center of priming information (e.g., list 520).

In block 960, only title nodes from the set may be selected. For example, search and discovery device 115 may identify only title nodes (e.g., versus other types of metadata instances, such as actor names, crew information, etc.) included in the set.

In block 965, the titles of contents may be ranked in descending order of activation. For example, search and discovery device 115 may rank the titles of contents, which are included in the search result, based on their activation values.

In block 970, the ranked titles of contents may be presented to the user. For example, search and discovery device 115 may present the search results to user 160 via the user interface. The search results may include one or more titles of one or more contents that may be ordered according to their ranking.

Although FIGS. 9A and 9B illustrate an exemplary process 900 of the priming-based search and discovery service, according to other embodiments, process 900 may include additional operations, fewer operations, and/or different operations than those illustrated in FIGS. 9A and 9B, and described herein. Process 900 may be iteratively performed. For example, subsequent to the presentment of the search result, user 160 may enter additional or new search terms. Process 900 may continue to block 905 or 910. Process 900 may end when user 160 exits the content service, selects content to view or download, and/or other user input (or lack thereof) that indicates a search process has ended.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described with regard to the processes illustrated in FIGS. 8A, 8B, 9A, and 9B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 710, etc.), or a combination of hardware and software (e.g., software 720). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 710) of a device. A non-transitory storage medium includes one or more of the storage mediums described in relation to memory/storage 715.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:

storing, by a network device, metadata pertaining to contents of a content service, wherein the metadata is stored in a weighted graph that includes nodes and weighted edges between the nodes, wherein each node indicates an instance of the metadata;

receiving, by a network device via a user interface of the content service, a search term from a user via a user device, wherein the search term includes one or multiple words;

searching, by the network device in response to the receiving, the weighted graph based on the search term;

selecting, by the network device in response to the searching, a set of one or more first nodes of the weighted graph that match the search term;

calculating, by the network device in response to the selecting, one or more first activation values pertaining to the one or more first nodes of the set;

determining, by the network device in response to the selecting, whether one or more second nodes of the weighted graph are connected to the one or more first nodes and within a maximum threshold distance from the one or more first nodes;

calculating, by the network device in response to determining that a first portion of the one or more second nodes are connected to the one or more first nodes and within the maximum threshold distance, one or more second activation values pertaining to the one or more second nodes based on the one or more first activation values, one or more current activation values associated with the one or more second nodes of the first portion, one or more weighted values associated with one or more of the weighted edges between the one or more second nodes of the first portion and the one or more first nodes, and one or more decay factor values, wherein each second activation value indicates a degree of relevance between each second node of the first portion and the search term;

adding, by the network device, the one or more second nodes of the first portion and the one or more second activation values, to the set;
comparing, by the network device, the one or more first activation values and the one more second activation values to a minimum threshold value;
selecting, by the network device in response to the comparing, a title of content for each node of the set that satisfies the minimum threshold value; and
presenting, by the network device via the user interface, a search result that includes one or more selected titles of contents.

2. The method of claim 1, wherein the maximum threshold distance includes a maximum hop count value.

3. The method of claim 1, further comprising:
initializing, by the network device, at least a portion of the nodes of the weighted graph with activation values prior to receiving the search term.

4. The method of claim 1, further comprising:
calculating, by the network device in response to determining that a second portion of the one or more second nodes are at least one of not connected to the one of the one or more first nodes or not within the maximum threshold distance, one or more third activation values, wherein each third activation value indicates a degree of relevance between each second node of the second portion and the search term.

5. The method of claim 4, wherein the calculating of the one or more third activation values comprises:
calculating, by the network device, each of the one or more third activation values based on a current activation value associated with one of the one or more second nodes of the second portion and a decay factor value.

6. The method of claim 1, further comprising:
storing, by the network device, user mind activation information that includes one or more fourth nodes and one or more fourth activation values pertaining to a previous search by the user; and
including, by the network device, the user mind activation information in the set.

7. The method of claim 1, further comprising:
comparing, by the network device, each of the one or more first activation values and each of the one or more second activation values to a minimum activation threshold value;
determining, by the network device based on the comparing with the minimum activation threshold value, that the one or more first activation values and the one or more second activation values satisfy the minimum activation threshold value;
storing, by the network device, user mind activation information that includes the one or more first nodes, the one or more first activation values, the one or more second nodes of the first portion, and the one or more second activation values; and
using, by the network device, the user mind activation information to initialize the metadata during a search subsequent to the presenting.

8. The method of claim 1, wherein the maximum threshold distance is a user preference of the user and has a value set by the user.

9. A network device comprising:
a communication interface;
a memory, wherein the memory stores instructions; and
a processor, wherein the processor executes the instructions to:

store metadata pertaining to contents of a content service, wherein the metadata is stored in a weighted graph that includes nodes and weighted edges between the nodes, wherein each node indicates an instance of the metadata;
receive, via a communication interface and a user interface of the content service, a search term from a user via a user device, wherein the search term includes one or multiple words;
search, in response to the receipt of the search term, the weighted graph based on the search term;
select, in response to the search, a set of one or more first nodes of the weighted graph that match the search term;
calculate, in response to the selection, one or more first activation values pertaining to the one or more first nodes of the set;
determine, in response to the selection, whether one or more second nodes of the weighted graph are connected to the one or more first nodes and within a maximum threshold distance from the one or more first nodes;
calculate, in response to a determination that a first portion of the one or more second nodes are connected to the the one or more first nodes and within the maximum threshold distance, one or more second activation values pertaining to the one or more second nodes based on the one or more first activation values, one or more current activation values associated with the one or more second nodes of the first portion, one or more weighted values associated with one or more of the weighted edges between the one or more second nodes of the first portion and the one or more first nodes, and one or more decay factor values, wherein each second activation value indicates a degree of relevance between each second node of the first portion and the search term;
add, the one or more second nodes of the first portion and the one or more second activation values, to the set;
compare, the one or more first activation values and the one more second activation values to a minimum threshold value;
select, in response to the comparison, a title of content for each node of the set that satisfies the minimum threshold value; and
present, via the user interface, a search result that includes one or more selected titles of contents.

10. The network device of claim 9, wherein the maximum threshold distance includes a maximum hop count value.

11. The network device of claim 9, wherein the processor further executes the instructions to:
initialize at least a portion of the nodes of the weighted graph with activation values prior to receiving the search term.

12. The network device of claim 9, wherein the processor further executes the instructions to:
calculate, in response to a determination that a second portion of the one or more second nodes are at least one of not connected to the one of the one or more first nodes or not within the maximum threshold distance, one or more third activation values, wherein each third activation value indicates a degree of relevance between each second node of the second portion and the search term.

13. The network device of claim 9, wherein the processor further executes the instructions to:

store, user mind activation information that includes one or more fourth nodes and one or more fourth activation values pertaining to a previous search by the user; and include the user mind activation information in the set.

14. The network device of claim 9, wherein the processor further executes the instructions to:
compare, each of the one or more first activation values and each of the one or more second activation values to a minimum activation threshold value;
determine, based on the comparison with the minimum activation threshold value, that the one or more first activation values and the one or more second activation values satisfy the minimum activation threshold value;
store, user mind activation information that includes the one or more first nodes, the one or more first activation values, the one or more second nodes of the first portion, and the one or more second activation values; and
use, the user mind activation information to initialize the metadata during a search subsequent to the presentment.

15. The network device of claim 9, wherein the maximum threshold distance is a user preference of the user and has a value set by the user.

16. A non-transitory, computer-readable storage medium storing instructions executable by a processor of a device, which when executed cause the device to:
store metadata pertaining to contents of a content service, wherein the metadata is stored in a weighted graph that includes nodes and weighted edges between the nodes, wherein each node indicates an instance of the metadata;
receive, via a user interface of the content service, a search term from a user via a user device, wherein the search term includes one or multiple words;
search, in response to the receipt of the search term, the weighted graph based on the search term;
select, in response to the search, a set of one or more first nodes of the weighted graph that match the search term;
calculate, in response to the selection, one or more first activation values pertaining to the one or more first nodes of the set;
determine, in response to the selection, whether one or more second nodes of the weighted graph are connected to the one or more first nodes and within a maximum threshold distance from the one or more first nodes;
calculate, in response to a determination that a first portion of the one or more second nodes are connected to the one of the one or more first nodes and within the maximum threshold distance, one or more second activation values pertaining to the one or more second nodes based on the one or more first activation values, one or more current activation values associated with the one or more second nodes of the first portion, one or more weighted values associated with one or more of the weighted edges between the one or more second nodes of the first portion and the one or more first nodes, and one or more decay factor values, wherein each second activation value indicates a degree of relevance between each second node of the first portion and the search term;
add, the one or more second nodes of the first portion and the one or more second activation values, to the set;
compare, the one or more first activation values and the one more second activation values to a minimum threshold value;
select, in response to the comparison, a title of content for each node of the set that satisfies the minimum threshold value; and
present, via the user interface, a search result that includes one or more selected titles of contents.

17. The non-transitory, computer-readable storage medium of claim 16, wherein the maximum threshold distance includes a maximum hop count value, and wherein the instructions to calculate further include instructions executable by the processor of the device, which when executed cause the device to:
initialize at least a portion of the nodes of the weighted graph with activation values prior to receiving the search term.

18. The non-transitory, computer-readable storage medium of claim 16, wherein the instructions further include instructions executable by the processor of the device, which when executed cause the device to:
store, user mind activation information that includes one or more fourth nodes and one or more fourth activation values pertaining to a previous search by the user; and include the user mind activation information in the set.

19. The non-transitory, computer-readable storage medium of claim 16, wherein the instructions further include instructions executable by the processor of the device, which when executed cause the device to:
compare, each of the one or more first activation values and each of the one or more second activation values to a minimum activation threshold value;
determine, based on the comparison with the minimum activation threshold value, that the one or more first activation values and the one or more second activation values satisfy the minimum activation threshold value;
store, user mind activation information that includes the one or more first nodes, the one or more first activation values, the one or more second nodes of the first portion, and the one or more second activation values; and
use, the user mind activation information to initialize the metadata during a search subsequent to the presentment.

20. The non-transitory, computer-readable storage medium of claim 16, wherein the maximum threshold distance is a user preference of the user and has a value set by the user.

* * * * *